US009104210B2

(12) United States Patent
Okubo

(10) Patent No.: US 9,104,210 B2
(45) Date of Patent: Aug. 11, 2015

(54) TIRE TEMPERATURE CONTROL DEVICE

(75) Inventor: Ryosuke Okubo, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 324 days.

(21) Appl. No.: 13/824,849

(22) PCT Filed: Sep. 28, 2010

(86) PCT No.: PCT/JP2010/066835
§ 371 (c)(1),
(2), (4) Date: Mar. 18, 2013

(87) PCT Pub. No.: WO2012/042597
PCT Pub. Date: Apr. 5, 2012

(65) Prior Publication Data
US 2013/0192814 A1    Aug. 1, 2013

(51) Int. Cl.
*G01M 17/02* (2006.01)
*G05D 23/19* (2006.01)
*B60C 23/18* (2006.01)
*B60C 23/20* (2006.01)

(52) U.S. Cl.
CPC ............... *G05D 23/19* (2013.01); *B60C 23/18* (2013.01); *B60C 23/20* (2013.01); *B60T 2210/12* (2013.01)

(58) Field of Classification Search
CPC ........ B60C 23/18; B60C 23/20; G05D 23/19; G01M 17/02
USPC .................................................. 73/146, 146.2
See application file for complete search history.

(56) References Cited

U.S. PATENT DOCUMENTS

| 8,606,535 B2 * | 12/2013 | Hafele et al. ................ 702/98 |
| 2003/0047264 A1 * | 3/2003 | Yurjevich et al. ............ 152/450 |
| 2004/0050151 A1 | 3/2004 | Kojima |
| 2006/0260389 A1 * | 11/2006 | Rimkus et al. ................ 73/146 |
| 2007/0073503 A1 * | 3/2007 | Hafele et al. ................ 702/98 |
| 2013/0158798 A1 * | 6/2013 | Igarashi ........................ 701/37 |

FOREIGN PATENT DOCUMENTS

| DE | 102006011919 A1 | 9/2006 |
| GB | 2457877 A | 9/2009 |
| JP | H03189216 A | 8/1991 |
| JP | 04-085118 A | 3/1992 |
| JP | H05-12203 U | 2/1993 |
| JP | 07-290916 A | 11/1995 |
| JP | 2004-082905 A | 3/2004 |
| JP | 2005051837 A | 2/2005 |
| JP | 2005-125812 A | 5/2005 |
| JP | 2005119617 A | 5/2005 |
| JP | 2006-051837 A | 2/2006 |
| JP | 2006-117144 A | 5/2006 |
| JP | 2006-142895 A | 6/2006 |
| JP | 2006-193058 A | 7/2006 |
| JP | 2010-195277 A | 9/2010 |

* cited by examiner

*Primary Examiner* — Eric S McCall
(74) *Attorney, Agent, or Firm* — Kenyon & Kenyon LLP

(57) ABSTRACT

A tire temperature control device includes a temperature control unit that controls at least one of a tire temperature of front wheels and a tire temperature of rear wheels based on a temperature difference between the temperature of the tire on the front wheel and the temperature of the tire on the rear wheel of a vehicle. The temperature control unit controls, for example, the tire temperature corresponding to predetermined temperatures based on temperature characteristics that are related to maneuverability of the vehicle, fuel economy of the vehicle, and a friction coefficient.

5 Claims, 21 Drawing Sheets ically, a technique that improves running performance of a vehicle has been proposed. Patent Literature 1 discloses a technique of a tire air pressure control device. The tire air pressure control device preliminarily performs a predictive control of tire pressure so as to obtain the maximum cornering force corresponding to a predicted load movement amount.

CITATION LIST

Patent Literature

Patent Literature 1: Japanese Patent Application Laid-open No. H04-085118

SUMMARY OF THE INVENTION

Technical Problem

There is a room for improvement in running performance of the vehicle.

An object of the present invention is to provide a tire temperature control device that improves running performance of a vehicle.

Solution to Problem

A tire temperature control device according to the present invention includes a temperature control means configured to control a tire temperature of a front wheel and a tire temperature of a rear wheel based on any two of a temperature characteristic of the tire related to maneuverability of a vehicle, a temperature characteristic of a tire related to fuel economy of the vehicle, a temperature characteristic of the tire related to a friction coefficient, and a temperature difference between the tire temperature of the front wheel and the tire temperature of the rear wheel of a vehicle.

In the tire temperature control device, it is preferable that the temperature control means is configured to make the tire temperature of the rear wheel less than the tire temperature of the front wheel, in a case where a first predetermined temperature that is based on a temperature characteristic of the tire related to maneuverability of the vehicle is higher than a second predetermined temperature that is based on a temperature characteristic of the tire related to fuel economy of the vehicle, the temperature control means makes the tire temperature of the front wheel to be the first predetermined temperature and also makes the tire temperature of the rear wheel to be the second predetermined temperature or a temperature lower than the first predetermined temperature by a predetermined temperature difference, and in a case where the first predetermined temperature is equal to or less than the second predetermined temperature, the temperature control means makes the tire temperature of the front wheel to be the first predetermined temperature, and also makes the tire temperature of the rear wheel to be the temperature lower than the first predetermined temperature by the predetermined temperature difference.

In the tire temperature control device, it is preferable that the temperature control means is configured to make the tire temperature of the rear wheel less than the tire temperature of the front wheel, in a case where a first predetermined temperature that is based on a temperature characteristic of the tire related to maneuverability of the vehicle is higher than a third predetermined temperature that is based on a temperature characteristic of the tire related to a friction coefficient, the temperature control means makes the tire temperature of the front wheel to be the third predetermined temperature and also makes the tire temperature of the rear wheel to be a temperature lower than the third predetermined temperature by a predetermined temperature difference, and in a case where the first predetermined temperature is equal to or less than the third predetermined temperature, the temperature control means makes the tire temperature of the front wheel to be the first predetermined temperature and also makes the tire temperature of the rear wheel to be the temperature lower than the first predetermined temperature by the predetermined temperature difference.

In the tire temperature control device, it is preferable that in a case where a first predetermined temperature that is based on a temperature characteristic of the tire related to maneuverability of the vehicle is higher than a third predetermined temperature that is based on a temperature characteristic of the tire related to a friction coefficient, the temperature control means makes the tire temperatures of the front wheel and the rear wheel to be the third predetermined temperature, and in a case where the first predetermined temperature is equal to or less than the third predetermined temperature, the temperature control means makes the tire temperatures of the front wheel and the rear wheel to be the first predetermined temperature.

In the tire temperature control device, it is preferable that in a case where a first predetermined temperature that is based on a temperature characteristic of the tire related to maneuverability of the vehicle is higher than a second predetermined temperature that is based on a temperature characteristic of the tire related to fuel economy of the vehicle, the temperature control means makes the tire temperatures of the front wheel and the rear wheel to be the second predetermined temperature, and in a case where the first predetermined temperature is equal to or less than the second predetermined temperature, the temperature control means makes the tire temperature of the front wheel to be the first predetermined temperature and also makes the tire temperature of the rear wheel to be the second predetermined temperature.

In the tire temperature control device, it is preferable that in a case where a second predetermined temperature that is based on a temperature characteristic of the tire related to fuel economy of the vehicle is higher than a third predetermined temperature that is based on a temperature characteristic of the tire related to a friction coefficient, the temperature control means makes the tire temperature of the front wheel to be the second predetermined temperature or the third predetermined temperature, and also makes the tire temperature of the rear wheel to be the second predetermined temperature, in a case where the second predetermined temperature approximates the third predetermined temperature, the temperature control means makes the tire temperatures of the front wheel and the rear wheel to be the second predetermined temperature, and in a case where the second predetermined temperature is lower than the third predetermined temperature, the temperature control means makes the tire temperatures of the front wheel and the rear wheel to be the third predetermined temperature.

Advantageous Effects of Invention

The tire temperature control device according to the present invention controls a tire temperature of a front wheel and a tire temperature of a rear wheel based on any two of a temperature characteristic of the tire related to maneuverability of a vehicle, a temperature characteristic of the tire related to fuel economy of the vehicle, a temperature characteristic of the tire related to a friction coefficient, and a temperature difference between the tire temperature of the front wheel and the tire temperature of the rear wheel of a vehicle. The tire temperature control device according to the present invention improves running performance of the vehicle as an advantageous effect.

DETAILED DESCRIPTION

Hereinafter, a description will be given of a tire temperature control device according to an embodiment of the present invention in detail by referring to the accompanying drawings. This embodiment does not limit the invention. The constituent elements described below include various modifications that will readily occur to those skilled in the art, modifications substantially similar thereto, or what is called equivalent range thereof.

First Embodiment

Figure 1:
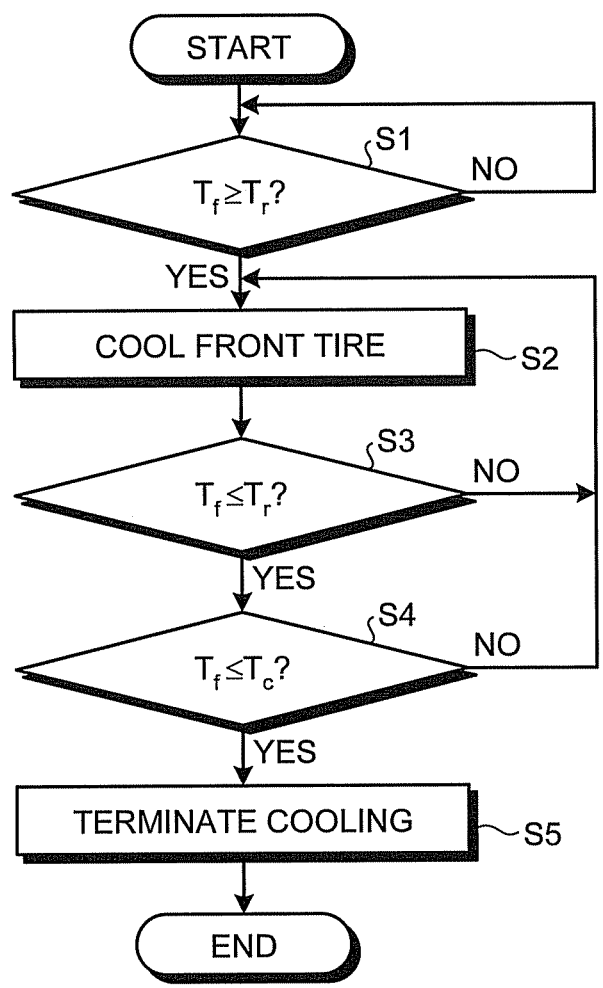
FIG. 1 is a flowchart illustrating operations of a tire temperature control according to a first embodiment.

A first embodiment will be described by referring to FIG. 1 to FIG. 5. This embodiment relates to a tire temperature control device. FIG. 1 is a flowchart illustrating operations of a tire temperature control according to this embodiment.

This embodiment controls a tire temperature focusing on a change in vehicle maneuverability corresponding to a tire temperature. A tire temperature control device 1-1 of this embodiment manages a tire temperature that improves vehicle maneuverability (steering feel, agility) based on temperature dependence of tire cornering characteristics.

This embodiment is assumed to have the following configuration.

(A) a mechanism that can actually measure or estimate tire tread temperatures of four wheels (B) "a mechanism that can cool or heat tires on four wheels" or "a mechanism that can control a driving force distribution, a braking force distribution, and a similar parameter so as to make a tire force to change" (a change in tire force consequently makes the tire temperature to change)

(C) "a mechanism that can control a cooling (heating) mechanism independently for each of four wheels to change a control corresponding to a tire temperature" or "a mechanism that can make a tire force to change independently for each of four wheels (alternatively, independently for each of front wheels and rear wheels) so as to make a control change corresponding to a tire temperature"

Figure 2:
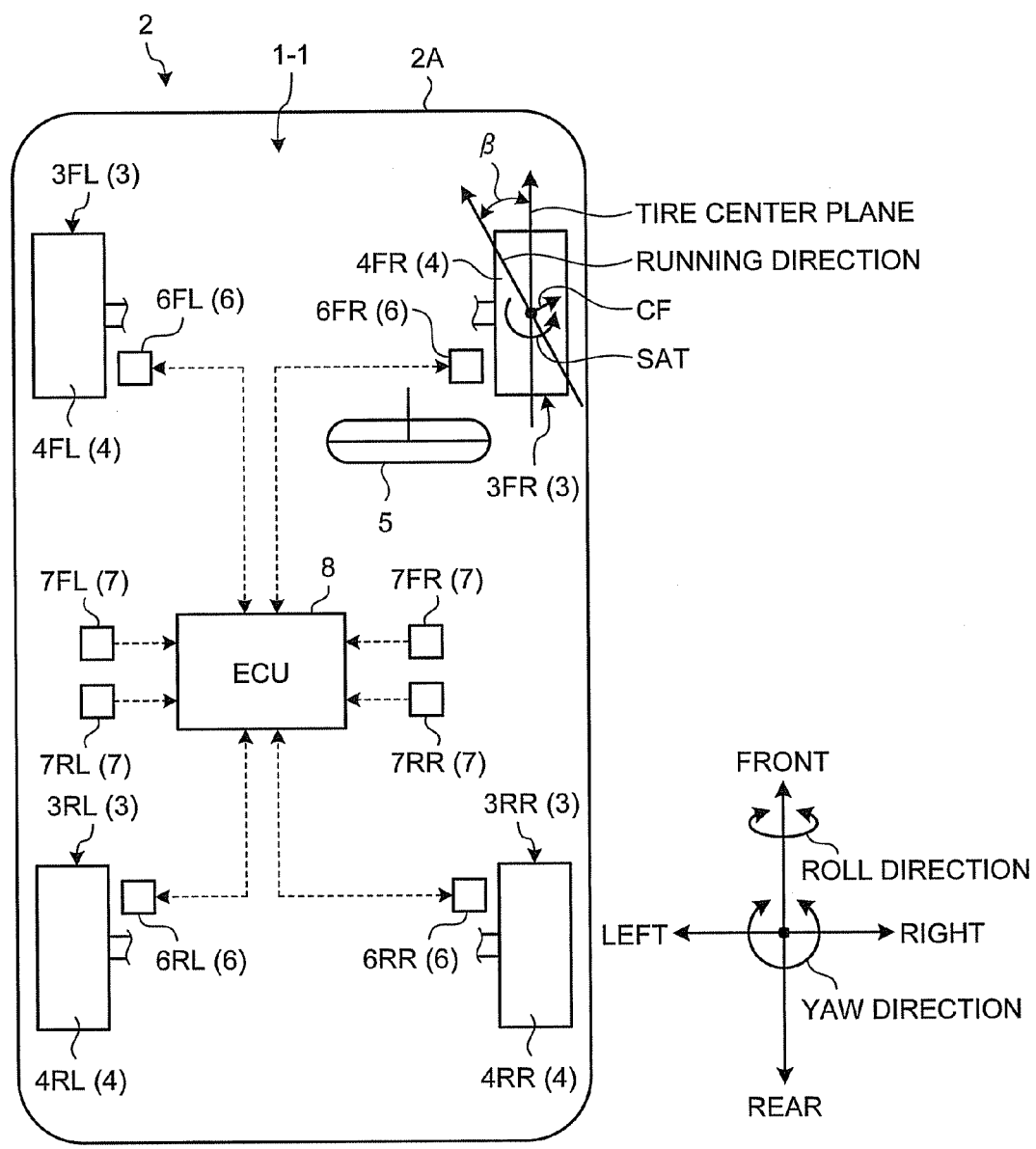
FIG. 2 is a diagram illustrating a schematic configuration of a vehicle where a tire temperature control device according to the embodiment is mounted.

FIG. 2 is a diagram illustrating a schematic configuration of a vehicle where the tire temperature control device 1-1 according to the embodiment is mounted. The tire temperature control device 1-1 is a device that is mounted on a vehicle 2 and controls a tire temperature of the vehicle 2.

The vehicle 2 includes four wheels 3 of a left front wheel 3FL, a right front wheel 3FR, a left rear wheel 3RL, and a right rear wheel 3RR. In the following description, a reference sign FL is assumed to denote a constituent element according to a left front wheel. A reference sign FR is assumed to denote a constituent element according to a right front wheel. A reference sign RL is assumed to denote a constituent element according to a left rear wheel. A reference sign RR is assumed to denote a constituent element according to a right rear wheel. The wheels 3 (3FL, 3FR, 3RL, and 3RR) have respective tires 4 (4FL, 4FR, 4RL, and 4RR). In the following description, in the case where the respective wheels 3 need not be particularly distinguished, members including the left front wheel 3FL and the right front wheel 3FR are described as "front wheels 3F" while members including the left rear wheel 3RL and the right rear wheel 3RR are described as "rear wheels 3R". In the case where the respective tires 4 need not be particularly distinguished, members including a left front tire 4FL and a right front tire 4FR are also described as "front tires 4F" while members including a left rear tire 4RL and a right rear tire 4RR are also described as "rear tires 4R".

The vehicle 2 includes a power source such as an engine and an electric motor in a vehicle body 2A. A power transmitted from the power source to a drive wheel (such as the left front wheel 3FL and the right front wheel 3FR) becomes a driving force on a contact surface between the drive wheel and a road surface, thus allowing the vehicle 2 to run. The vehicle 2 includes a steering wheel 5. Turning of the steering wheel 5 by the driver steers a steered wheel (such as the left front wheel 3FL and the right front wheel 3FR), thus allowing the vehicle 2 to turn.

A front-rear direction, which will be described below, of the vehicle 2 is a direction along a running direction of the vehicle 2. A lateral direction of the vehicle 2 is a width direction of the vehicle 2 perpendicular to the front-rear direction and the vertical direction. A yaw direction is a direction around the up-down axis that is an axis along the vertical direction of the vehicle 2.

Here, tire characteristics of the tires 4 mounted on the wheels 3 including a cornering power, a self-aligning power, and a similar parameter have temperature dependence. In view of this, the tire characteristics of the tires 4 including the cornering power, the self-aligning power, and a similar parameter change corresponding to temperatures of the respective tires 4 even if the tires 4 each employ the same tire.

The cornering power of the tires 4 corresponds to a cornering force CF per unit slip angle (sideslip angle) $\beta$ illustrated in FIG. 2. The slip angle $\beta$ is an angle formed by a running direction of the tires 4 and a tire center plane. The cornering force CF is a component force that is applied to a right angle direction with respect to the running direction of the tires 4 when the vehicle 2 corners (turns). The self-aligning power of the tires 4 corresponds to a self-aligning torque SAT per unit slip angle $\beta$ illustrated in FIG. 2. The self-aligning torque SAT is a moment around a grounding point (around the vertical axis) of the tire 4, and corresponds to a restoring force to restore the steering wheel 5 to a straight ahead position. In the case where the tires 4 is rolling with a predetermined slip angle $\beta$, a force application point is displaced off the cornering force CF with respect to the central grounding point of the tires 4. Thus, a force (torque) is applied to the tires 4 around the central grounding point in a direction to reduce the slip angle $\beta$. This force corresponds to the self-aligning torque SAT. The self-aligning torque SAT affects straight line stability and stiffness of the steering wheel 5.

Figure 3:
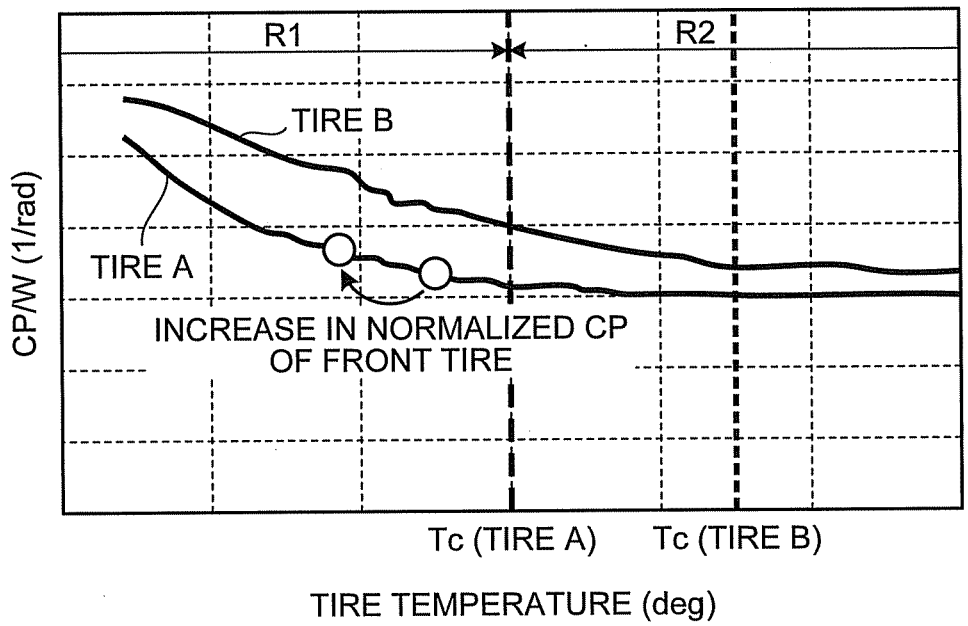
FIG. 3 is a graph illustrating a relationship between a tire temperature and a normalized CP.
Figure 4:
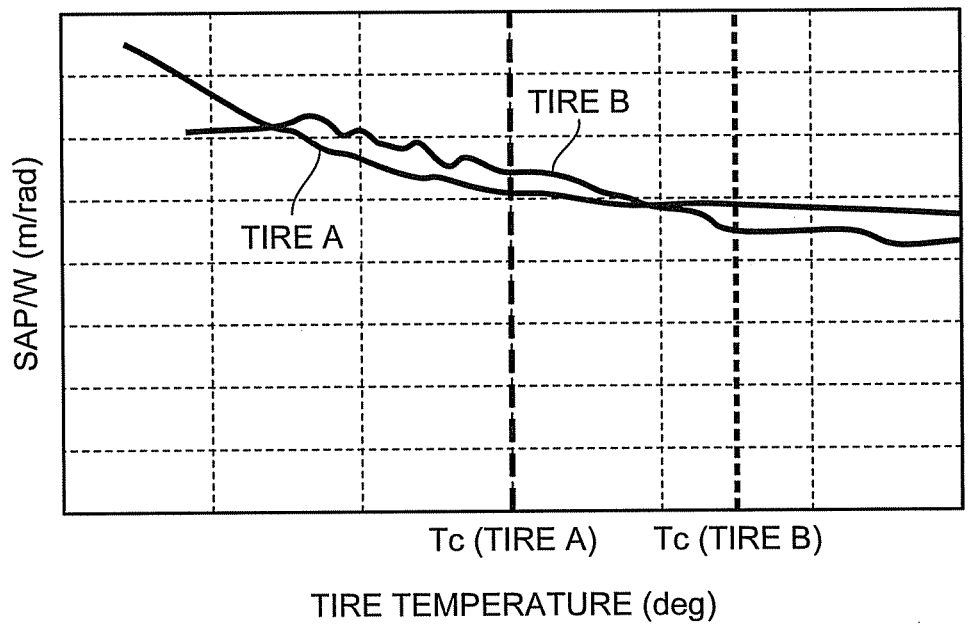
FIG. 4 is a graph illustrating a relationship between tire temperature and normalized SAP.

FIG. 3 is a graph illustrating a relationship between a temperature and a normalized cornering power of the tires 4. FIG. 4 is a graph illustrating a relationship between a temperature and a normalized self-aligning power of the tires 4. FIG. 3 and FIG. 4 illustrate temperature characteristics of the tires 4 related to maneuverability of the vehicle 2. FIG. 3 illustrates relationships between a normalized cornering power and a temperature for a tire A and a tire B that have different characteristics. Here, the normalized cornering power is a value of a cornering power divided by an axle load W. In the following description, the normalized cornering power is simply described as a "normalized CP". The normalized self-aligning power is a value of a self-aligning power divided by an axle load. In the following description, the normalized self-aligning power is simply described as a "normalized SAP". The normalized SAP can be calculated from the normalized CP.

As illustrated in FIG. 3, the normalized CP tends to decrease with increasing the temperature of the tires 4. This is because a higher temperature makes tread rubber of the tires 4 flexible and the tires 4 deforms more easily. The normalized CP decreases with increasing the temperature until the temperature of the tires 4 reaches a first predetermined temperature Tc. In the case where the temperature of the tires 4 exceeds the first predetermined temperature Tc, the normalized CP hardly changes with respect to change in temperature. The first predetermined temperature Tc is a critical temperature based on the characteristics of the tires 4 and different depending on a type and a similar parameter of the tires 4. For example, in the case of the tire A, the normalized CP comparatively significantly decreases with increasing the temperature of the tires 4 in a first temperature region R1 where the temperature of the tires 4 is equal to or less than the first predetermined temperature Tc (tire A). On the other hand, a degree of decrease in normalized CP with respect to increase in temperature of the tires 4 in a second temperature region R2 at a higher temperature than the first predetermined temperature Tc (tire A) is smaller than a degree of decrease in normalized CP in the first temperature region R1.

FIG. 4 illustrates the relationships between a normalized SAP and a temperature for the tire A and the tire B. As illustrated in FIG. 4, the normalized SAP decreases with increasing the temperature until the temperature of the tires 4 reaches the first predetermined temperature Tc. In the case where the temperature of the tires 4 exceeds the first predetermined temperature Tc, the normalized SAP hardly changes with respect to change in temperature.

Thus, a cornering characteristic of the tire 4, that is, maneuverability changes depending on the temperature of the tires 4. A cornering characteristic of the vehicle 2 changes depending on a temperature (hereinafter referred to as a "front tire temperature") Tf of the tires (the left front tire 4FL and the right front tire 4FR) of the front wheels in the vehicle 2. The cornering characteristic of the vehicle 2 also changes depending on a temperature difference between the front tire temperature Tf and a temperature (hereinafter referred to as a "rear tire temperature") Tr of the tires (the left rear tire 4RL and the right rear tire 4RR) of the rear wheels in the vehicle 2. For example, a turning performance of the vehicle 2 changes depending on whether or not the front tire temperature Tf is smaller than the rear tire temperature Tr.

The tire temperature control device 1-1 of this embodiment controls the temperature of the tires 4 based on the temperature difference between the front tire temperature Tf and the rear tire temperature Tr. The tire temperature control device 1-1 includes an ECU 8, a temperature sensor 7, a temperature control means 6. The ECU 8 is an electronic control unit with a computer. The ECU 8 can control each portion of the vehicle 2, and has a function as a controller that controls the temperature of the tires 4.

The ECU 8 preliminarily stores the temperature characteristic of the tires 4 that is mounted on the wheel 3. Here, the stored temperature characteristic may be, for example, the correspondence relationship between the tire temperature and the normalized CP illustrated in FIG. 3, the first predetermined temperature Tc based on this correspondence relationship, or a value indicative of another temperature characteristic. That is, any configuration is possible insofar as the ECU 8 preliminarily stores a numerical value that indicates the temperature characteristic of the tires 4 related to maneuverability (turning performance) and is required for a tire temperature control. The ECU 8 performs a tire temperature control based on the stored temperature characteristic of the tires 4.

The temperature sensor 7 detects the temperature of the tires 4. For example, the temperature sensor 7 can employ a thermocouple, a thermistor, or a similar sensor. More specifically, the temperature sensor 7 detects a temperature inside the tread of the tires 4 such as temperatures of a carcass layer and a belt layer that are structural members inside of the tread, alternatively, a temperature of the tread rubber. Preferably, the temperature sensor 7 may detect a temperature inside of the tread rubber between a tread surface of the tires 4 and an upper surface of the belt layer.

In this embodiment, the temperature sensor 7 is disposed in each of the tires 4. That is, the left front tire 4FL includes a temperature sensor for the left front wheel 7FL, the right front tire 4FR includes a temperature sensor for the right front wheel 7FR, the left rear tire 4RL includes a temperature sensor for the left rear wheel 7RL, and the right rear tire 4RR includes a temperature sensor for the right rear wheel 7RR. The respective temperature sensors 7FL, 7FR, 7RL, and 7RR are coupled to the ECU 8. Signals indicating detection results of the respective temperature sensors 7FL, 7FR, 7RL, and 7RR are output to the ECU 8. In the following description, in the case where the respective temperature sensors 7FL, 7FR, 7RL, and 7RR need not be particularly distinguished, the temperature sensor for the left front wheel 7FL and the temperature sensor for the right front wheel 7FR are collectively described as "temperature sensors for the front wheels 7F" while the temperature sensor for the left rear wheel 7RL and the temperature sensor for the right rear wheel 7RR are collectively described as "temperature sensors for the rear wheels 7R".

The temperature sensor 7 may employ a non-contact temperature sensor that is infrared-based. The temperature sensor 7 may detect a wheel temperature where the tires 4 is mounted, and may detect and estimate a temperature inside the tread of the tires 4 based on the detection of the wheel temperature, for example.

The temperature control means 6 controls the temperature of the tires 4. For example, the temperature control means 6 discharges cool air and hot air from an air conditioner, exhaust gas, and similar gas into a wheel housing of the tires 4 so as to adjust the tire temperature. The cool air, the hot air, and the exhaust gas may be directly sprayed on the tires 4. The temperature control means 6 adjusts discharging and stopping the cool air, the hot air, and the exhaust gas and discharge quantity so as to control the temperature of the tires 4. For example, the temperature control means 6 can reduce the temperature of the tires 4 by cooling the tire 4, can increase the temperature of the tires 4 by heating the tire 4, and can additionally maintain the temperature of the tires 4 at a desired temperature.

The temperature control means 6 includes a left front wheel temperature control means 6FL disposed for the left front wheel 3FL, a right front wheel temperature control means 6FR disposed for the right front wheel 3FR, a left rear wheel temperature control means 6RL disposed for the left rear wheel 3RL, a right rear wheel temperature control means 6RR disposed for the right rear wheel 3RR. Each of the temperature control means 6FL, 6FR, 6RL, and 6RR can operate independently. That is, the temperature control means 6 for each wheel 3 can cool or heat the tires 4 independently from the temperature control means 6 for the other wheels 3. Accordingly, for example, in the case where temperatures of the right and left tires 4 are different and a desired temperature is an intermediate temperature of the right and left tires 4, the above-described configuration allows controlling the temperatures of the right and left tires 4 to the desired temperature by heating the tires 4 at relatively low temperature and cooling the tires 4 at relatively high temperature. The temperature control means 6 is coupled to the ECU 8, and controlled by the ECU 8.

In the following description, in the case where the temperature control means 6 need not be particularly distinguished, the left front wheel temperature control means 6FL and the right front wheel temperature control means 6FR are simply described as "front wheel temperature control means 6F". In the case where the temperature control means 6 need not be particularly distinguished, the left rear wheel temperature control means 6RL and the right rear wheel temperature control means 6RR are simply described as "rear wheel temperature control means 6R". The tire temperature control device 1-1 can control at least one of the front tire temperature Tf and the rear tire temperature Tr by the temperature control means 6 based on the temperature difference between the front tire temperature Tf and the rear tire temperature Tr.

Referring to FIG. 1, a temperature control of the tires 4 according to this embodiment will be described. A control process in FIG. 1 is repeatedly performed when the vehicle 2 is running. This control process may be performed when the vehicle 2 is stopped. For example, this control process is repeatedly performed at a predetermined interval.

First, at step S1, the ECU 8 determines whether or not the front tire temperature Tf is equal to or more than the rear tire temperature Tr. At step S1, it is determined whether or not the control interrupts the operation. Increase in normalized CP of the front tires 4F improves maneuverability of the vehicle 2. That is, from the aspect of improving the maneuverability, the front tire temperature Tf is preferred to be at low temperature. In this embodiment, in the case where the front tire temperature Tf is equal to or more than the rear tire temperature Tr, cooling of the front tires 4F is performed.

The ECU 8 performs the determination at step S1 based on the temperature of the tires 4 detected by the temperature sensor 7. Temperatures of the front tires 4F are obtained by the temperature sensors for the front wheels 7F. For example, the ECU 8 assumes an average temperature of the temperature of the left front tire 4FL detected by the temperature sensor for the left front wheel 7FL and the temperature of the right front tire 4FR detected by the temperature sensor for the right front wheel 7FR as the front tire temperature Tf.

The same applies to the rear tire temperature Tr. For example, the ECU 8 assumes an average temperature of the temperature of the left rear tire 4RL detected by the temperature sensor for the left rear wheel 7RL and the temperature of the right rear tire 4RR detected by the temperature sensor for the right rear wheel 7RR as the rear tire temperature Tr.

As a result of the determination at step S1, in the case where the front tire temperature Tf is determined to be equal to or more than the rear tire temperature Tr (Yes in step S1), the process proceeds to step S2. Otherwise, the determination at step S1 is repeated (No in step S1).

At step S2, the ECU 8 cools the front tire 4F. The ECU 8 cools the front tires 4F by the front wheel temperature control means 6F. The ECU 8 outputs a cooling command to the front wheel temperature control means 6F. The front wheel temperature control means 6F cools the front tires 4F based on the cooling command.

In the case where the temperature of the left front tire 4FL and the temperature of the right front tire 4FR are different when the front tires 4F are cooled, a degree of cooling the left front tire 4FL by the left front wheel temperature control means 6FL and a degree of cooling the right front tire 4FR by the right front wheel temperature control means 6FR may be different. For example, in the case where the left front tire 4FL has a higher temperature than that of the right front tire 4FR, a degree of cooling the left front tire 4FL may be higher than the degree of cooling the right front tire 4FR. Cooling the front tires 4F increases the normalized CP of the front tires 4F as illustrated in FIG. 3. After step S2 is performed, the process proceeds to step S3.

At step S3, the ECU 8 determines whether or not the front tire temperature Tf is equal to or less than the rear tire temperature Tr. At step S3, it is determined whether or not the front tires 4F is sufficiently cooled. The front tire temperature Tf that is equal to or less than the rear tire temperature Tr increases the normalized CP of the front tire 4F, thus improving turning performance. As a result of the determination at step S3, in the case where the front tire temperature Tf is determined to be equal to or less than the rear tire temperature Tr (Yes in step S3), the process proceeds to step S4. Otherwise, the process proceeds to step S2 (No in step S3).

Subsequently, at step S4, the ECU 8 determines whether or not the front tire temperature Tf is equal to or less than the first predetermined temperature Tc. As described by referring to FIG. 3, a degree of increase in normalized CP is smaller than decrease in temperature of the tires 4 in a temperature range that is higher than the first predetermined temperature Tc. In other words, improving steering performance by changing the temperature of the tires 4 has a small advantage in the temperature range higher than the first predetermined temperature Tc. The tire temperature control device 1-1 of this embodiment cools the front tires 4F until the front tire temperature Tf becomes equal to or less than the first predetermined temperature Tc so as to obtain an advantage of improvement of steering performance by cooling the front tire 4F. As a result of the determination at step S4, in the case where the front tire temperature Tf is determined to be equal to or less than the first predetermined temperature Tc (Yes in step S4), the process proceeds to step S5. Otherwise, the process proceeds to step S2 (No in step S4) to continue cooling the front tire 4F.

At step S5, the ECU 8 terminates the cooling. The ECU 8 outputs a command for termination of the cooling to the front wheel temperature control means 6F. This command signal allows the left front wheel temperature control means 6FL and the right front wheel temperature control means 6FR to terminate the cooling. After step S5 is performed, this control process terminates.

Figure 5:
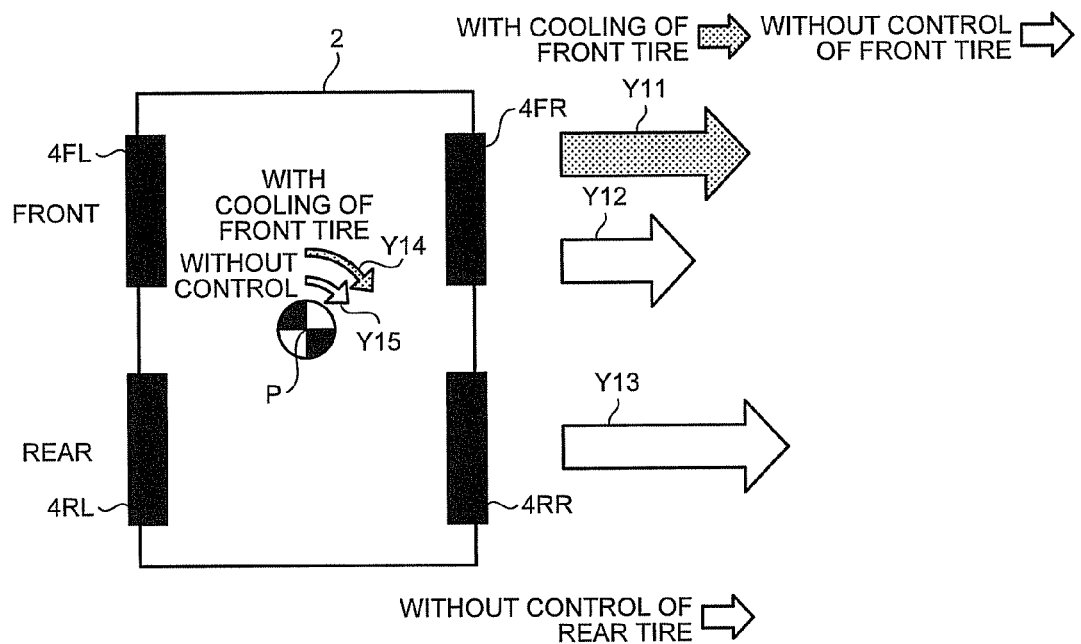
FIG. 5 is a diagram illustrating effects of the tire temperature control according to the first embodiment.

FIG. 5 is a diagram illustrating effects of the tire temperature control according to this embodiment. In FIG. 5, a reference sign P denotes the gravity point of the vehicle 2. An arrow Y11 indicates the normalized CP of the front tires 4F after cooling by the tire temperature control of this embodiment. An arrow Y12 indicates the normalized CP of the front tires 4F in the case where the tire temperature control is not performed. An arrow Y13 indicates the normalized CP of the rear tires 4R. Additionally, an arrow Y14 indicates the turning performance in the case where the front tires 4 is cooled by the tire temperature control. An arrow Y15 indicates the turning performance in the case where the tire temperature control is not performed. Lengths of the arrows Y14 and Y15 indicate cornering forces and yaw rates that are generated with, for example, the same amount of steering.

As illustrated in FIG. 5, cooling the front tires 4F by the tire temperature control of this embodiment increases the normalized CP (Y11) of the front tires 4F after cooling, compared with the normalized CP (Y12) of the front tires 4F where the tire temperature control is not performed. This improves the turning performance Y14 after the tire temperature control, compared with turning performance Y15 where the tire temperature control is not performed.

As described above, in this embodiment, cooling the front tires 4F increases the normalized CP of the front tires 4F in the case where the front tire temperature Tf is higher than the rear tire temperature Tr. This improves the turning performance of the vehicle 2, thus improving maneuverability.

In the case where the front tire temperature Tf is equal to or less than the first predetermined temperature Tc (Yes in step S4) when the front tire temperature Tf becomes equal to or less than the rear tire temperature Tr (Yes in step S3), cooling the front tires 4F is terminated. That is, in this embodiment, the temperature control means 6 reduces the temperature difference between the front tire temperature Tf and the rear tire temperature Tr, and makes the front tire temperature Tf equal to or less than the rear tire temperature Tr.

In contrast, in the case where the front tire temperature Tf is not equal to or less than the first predetermined temperature Tc (No in step S4), cooling the front tires 4F continues. That is, in the case where the tires 4 that is mounted on the wheel 3 is the tire A illustrated in FIG. 3, the front tires 4F is cooled until the front tire temperature Tf becomes a temperature in the first temperature region R1. In other words, the temperature control means 6 makes the front tire temperature Tf equal to or less than the first predetermined temperature Tc. This tire temperature control reduces the temperature difference between the front tire temperature Tf and the rear tire temperature Tr in a range where the front tire temperature Tf is equal to or less than the first predetermined temperature Tc.

Accordingly, cooling the front tires 4F increases the normalized CP of the front tire 4F, thus improving maneuverability. If the front tire temperature Tf further decreases at running after this control, the normalized CP of the front tires 4F is further increased, thus improving maneuverability. In contrast, in the case where the front tire temperature Tf increases, the tire temperature control device 1-1 performs cooling of the front tires 4F again. That is, this embodiment reduces decrease of the normalized CP of the front tires 4F to ensure maneuverability, thus improving drivability.

The tire temperature control device 1-1 of this embodiment controls the tire temperature to allow controlling performance of the vehicle 2 arbitrarily to some extent. Previously, a suspension, an absorber, and a similar member have been required to be exchanged in order to change maneuverability of the same vehicle 2. However, the tire temperature control device 1-1 of this embodiment controls the tire temperature to easily vary vehicle performance without exchanging the components.

In the control process illustrated in FIG. 1, an equality sign may be excluded from any one of the inequality sign in the criterion formula at step S1 and the inequality sign in the criterion formula at step S3. That is, only in the case where the front tire temperature Tf is larger than the rear tire temperature Tr at step S1, affirmative determination may be made. Alternatively, only in the case where the front tire temperature Tf is less than the rear tire temperature Tr at step S3, affirmative determination may be made.

In this embodiment, the temperature sensor 7 detects the temperature inside the tread, typically, the temperature inside of the tread rubber. The temperature inside the tread easily affects the tire characteristics including the cornering power and the self-aligning power of the tire 4, and has a smaller change than that on a surface of the tires 4. Controlling the tire temperature based on the tire temperature thus detected allows accurately control maneuverability of the vehicle 2.

While in this embodiment, the first predetermined temperature Tc is determined based on the normalized CP, this should not be construed in a limiting sense. The first predetermined temperature Tc may be determined based on another temperature characteristic of the tires 4 such as the normalized SAP, which is related to maneuverability.

While in this embodiment, the temperature sensor 7 is disposed in each of the tires 4 on the four wheels, this should not be construed in a limiting sense. The temperature sensor for the front wheel 7F may be disposed in at least one of the left front tire 4FL and the right front tire 4FR. The temperature sensor for the rear wheel 7R may be disposed in at least one of the left rear tire 4RL and the right rear tire 4RR. In the case where the temperature sensor for the front wheel 7F is disposed in any of the left front tire 4FL and the right front tire 4FR, the ECU 8 employs a detection result of the temperature sensor for the front wheel 7F as the front tire temperature Tf. The same applies to the rear tire temperature Tr. In the case where the temperature sensor for the rear wheel 7R is disposed in any of the left rear tire 4RL and the right rear tire 4RR, a temperature detected by the temperature sensor for the rear wheel 7R is employed as the rear tire temperature Tr.

While in this embodiment, an example where the temperature characteristics of the tires 4 are preliminarily stored is described, this should not be construed in a limiting sense. The temperature characteristics of the tires 4 may be estimated at running. For example, the temperature characteristics of the tires 4 may be estimated based on behavior of the vehicle 2 at running and a temperature of the tires 4. As an example, the temperature control means 6 may control the temperature (such as the front tire temperature Tf) of the tires 4 to be a plurality of different temperatures as necessary, and may estimate the temperature characteristics of the tires 4 based on a behaviors of the vehicle 2 at respective tire temperatures.

While in this embodiment, the temperature control means 6 cools and heat the tires 4 by discharging the cool air, the hot air, and similar gas, this should not be construed in a limiting sense. The temperature control means 6 may be another means that provides heat to the tires 4 from outside or inside of the tires 4 or provides heat removal from the tires 4. The temperature control means 6 may control a heat generation amount in the tires 4. For example, the temperature control means 6 may heat or cool the tires 4 by controlling the braking force and the driving force of the tires 4 so as to increase and decrease load on the tires 4.

First Modification of the First Embodiment

Figure 6:
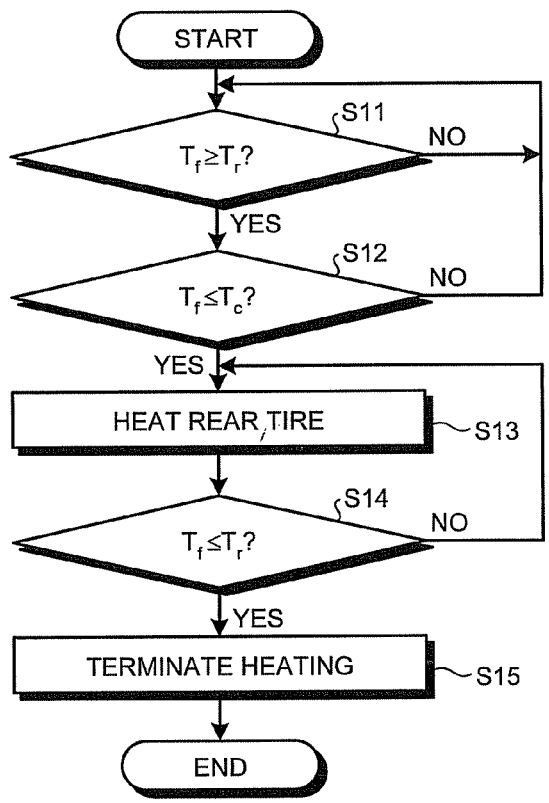
FIG. 6 is a flowchart illustrating operations of a tire temperature control according to a first modification.
Figure 7:
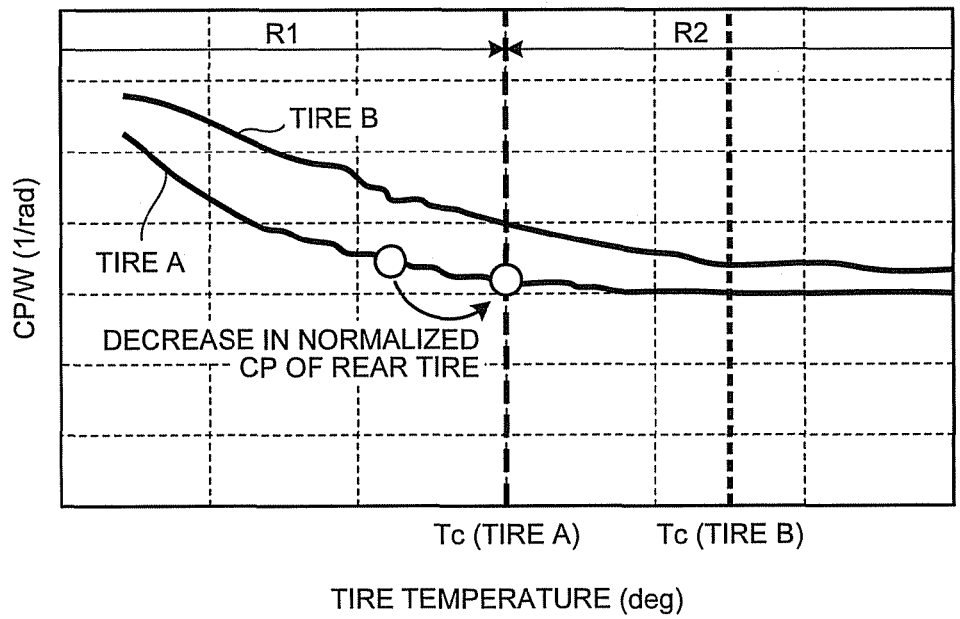
FIG. 7 is a graph illustrating a change in normalized CP according to the first modification.
Figure 8:
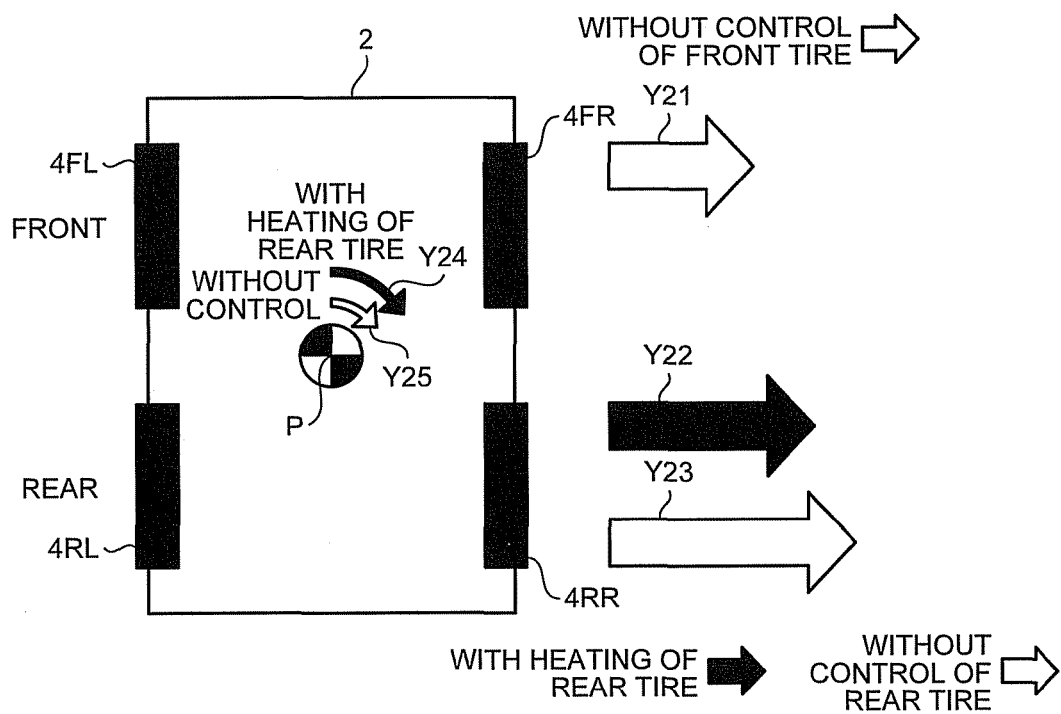
FIG. 8 is a diagram illustrating effects of the tire temperature control according to the first modification.

A first modification of the first embodiment will be described. While in the above-described first embodiment, cooling the front tires 4F improves maneuverability, this modification differs from the above-described first embodiment in that this modification heats the rear tires 4R to decrease the front tire temperature Tf relative to the rear tire temperature Tr so as to improve maneuverability. FIG. 6 is a flowchart illustrating operations of a tire temperature control according to this modification. FIG. 7 is a graph illustrating a change in normalized CP according to this modification. FIG. 8 is a diagram illustrating effects of the tire temperature control according to this modification.

As illustrated in FIG. 7, this modification heats the rear tires 4R to increase the rear tire temperature Tr, thus reducing the normalized CP of the rear tires 4R. This relatively increases the normalized CP of the front tire 4F, thus improving turning performance (maneuverability).

Referring to FIG. 6, the tire temperature control of this modification will be described. A control process illustrated in FIG. 6 is repeatedly performed when the vehicle 2 is running. This control process may be performed when the vehicle 2 is stopped. For example, this control process is repeatedly performed at a predetermined interval.

First, at step S11, the ECU 8 determines whether or not the front tire temperature Tf is equal to or more than the rear tire temperature Tr. In this modification, in the case where the front tire temperature Tf is equal to or more than the rear tire temperature Tr, the ECU 8 heats the rear tires 4R to increase the rear tire temperature Tr to a temperature equal to or more than the front tire temperature Tf. This improves maneuverability.

As a result of the determination at step S11, in the case where the front tire temperature Tf is determined to be equal to or more than the rear tire temperature Tr (Yes in step S11), the process proceeds to step S12. Otherwise, the process proceeds to step S11 again (No in step S11). That is, while the front tire temperature Tf is less than the rear tire temperature Tr, the acquisition of the front tire temperature Tf and the rear tire temperature Tr, and the determination to compare both of them are repeatedly performed.

At step S12, the ECU 8 determines whether or not the front tire temperature Tf is equal to or less than the first predetermined temperature Tc. At step S12, it is determined whether or not performance change by changing the temperature of the tires 4 is expected. In the case where the front tire temperature Tf is higher than the first predetermined temperature Tc, that is, in the case where the front tire temperature Tf is in the second temperature region R2, decrease in normalized CP of the rear tires 4R is small even if the rear tire temperature Tr is increased to a temperature equal to or more than the front tire temperature Tf. Accordingly, the performance change by the tire temperature control is hardly expected. In view of this, in the case where the front tire temperature Tf is higher than the first predetermined temperature Tc, the tire temperature control is not performed.

As a result of the determination at step S12, in the case where the front tire temperature Tf is determined to be equal to or less than the first predetermined temperature Tc (Yes in step S12), the process proceeds to step S13. Otherwise, the process proceeds to step S11 (No in step S12).

At step S13, the ECU 8 outputs a heating command for the rear tires 4R. The ECU 8 outputs a command for heating the rear tires 4R to the rear wheel temperature control means 6R. The rear wheel temperature control means 6R receives the heating command and heats the rear tires 4R. In the case where the temperature of the left rear tire 4RL and the temperature of the right rear tire 4RR are different when the rear tires 4R is heated, a degree of heating the left rear tire 4RL by the left rear wheel temperature control means 6RL and a degree of heating the right rear tire 4RR by the right rear wheel temperature control means 6RR may be different. For example, in the case where the left rear tire 4RL has a lower temperature than that of the right rear tire 4RR, a degree of heating the left rear tire 4RL may be higher than a degree of heating the right rear tire 4RR. After step S13 is performed, the process proceeds to step S14.

At step S14, the ECU 8 determines whether or not the front tire temperature Tf is equal to or less than the rear tire temperature Tr. At step S14, it is determined whether or not the rear tires 4R is sufficiently heated. As a result of the determination at step S14, in the case where the front tire temperature Tf is determined to be equal to or less than the rear tire temperature Tr (Yes in step S14), the process proceeds to step S15. Otherwise, the process proceeds to step S13 (No in step S14) to continue heating the rear tires 4R.

At step S15, the ECU 8 terminates the heating of the rear tires 4R. The ECU 8 outputs a command for termination of the heating to the rear wheel temperature control means 6R. This command signal allows the left rear wheel temperature control means 6RL and the right rear wheel temperature control means 6RR to terminate the heating. After step S15 is performed, this control process terminates.

Referring to FIG. 8, advantageous effects of this modification will be described. In FIG. 8, an arrow Y21 indicates the normalized CP of the front tire 4F. An arrow Y22 indicates the normalized CP of the rear tires 4R after heating by the tire temperature control of this modification. An arrow Y23 indicates the normalized CP of the rear tires 4R in the case where the tire temperature control is not performed. Additionally, an arrow Y24 indicates the turning performance after heating by the tire temperature control. An arrow Y25 indicates the turning performance in the case where the tire temperature control is not performed. Heating the rear tires 4R by the tire temperature control of this modification decreases the normalized CP (Y22) of the rear tires 4R after heating, compared with the normalized CP (Y23) of the rear tires 4R where the tire temperature control is not performed. This relatively increases the normalized CP (Y21) of the front tire 4F, thus improving the turning performance Y24 where the tire temperature control is performed, compared with turning performance Y25 where the tire temperature control is not performed.

In the control process illustrated in FIG. 6, in the case where negative determination is made at step S12, the tire temperature control may be shifted to a control that cool the front tires 4F of the above-described first embodiment (in FIG. 1). That is, cooling the front tires 4F or heating the rear tires 4R may be selected based on the temperature of the front tire 4F.

Second Modification of the First Embodiment

Figure 9:
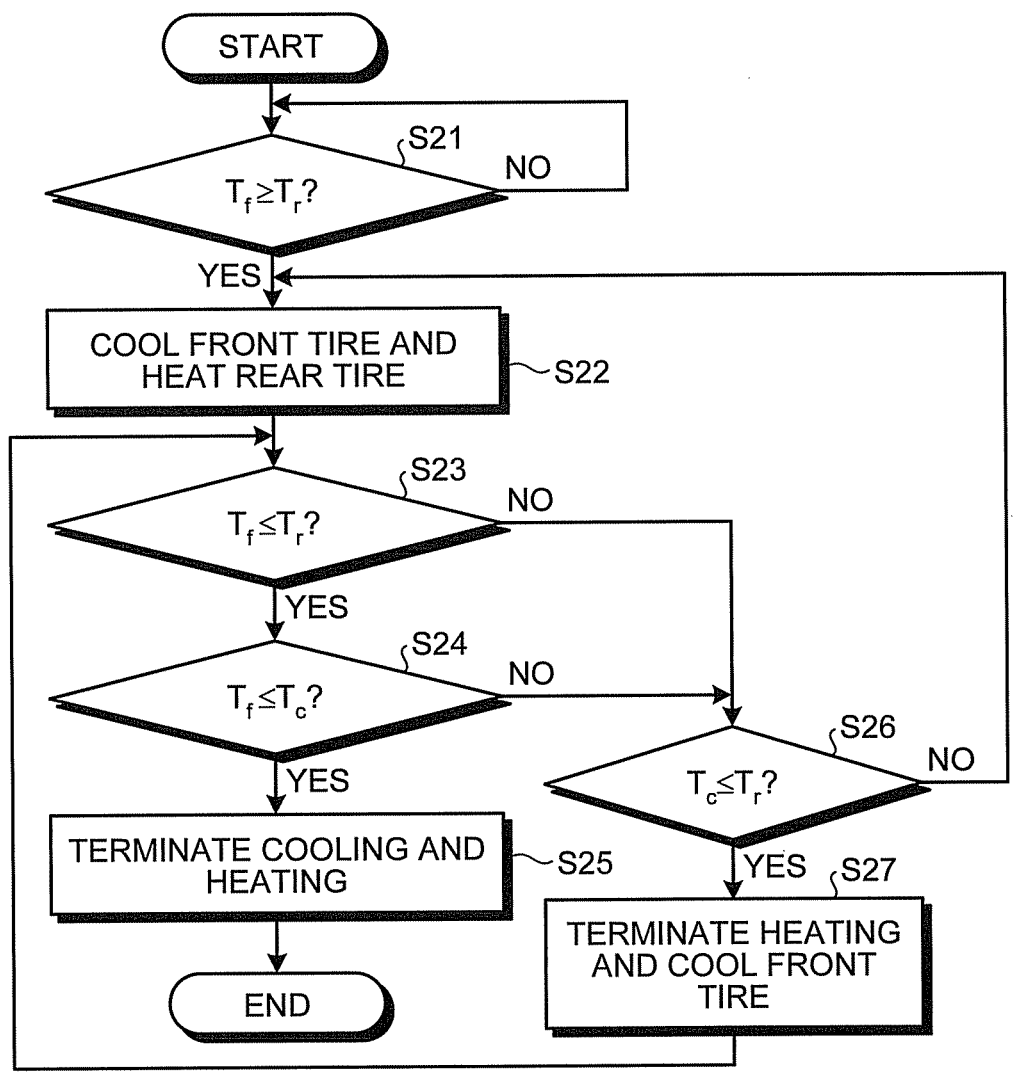
FIG. 9 is a flowchart illustrating operations of a tire temperature control according to a second modification.
Figure 10:
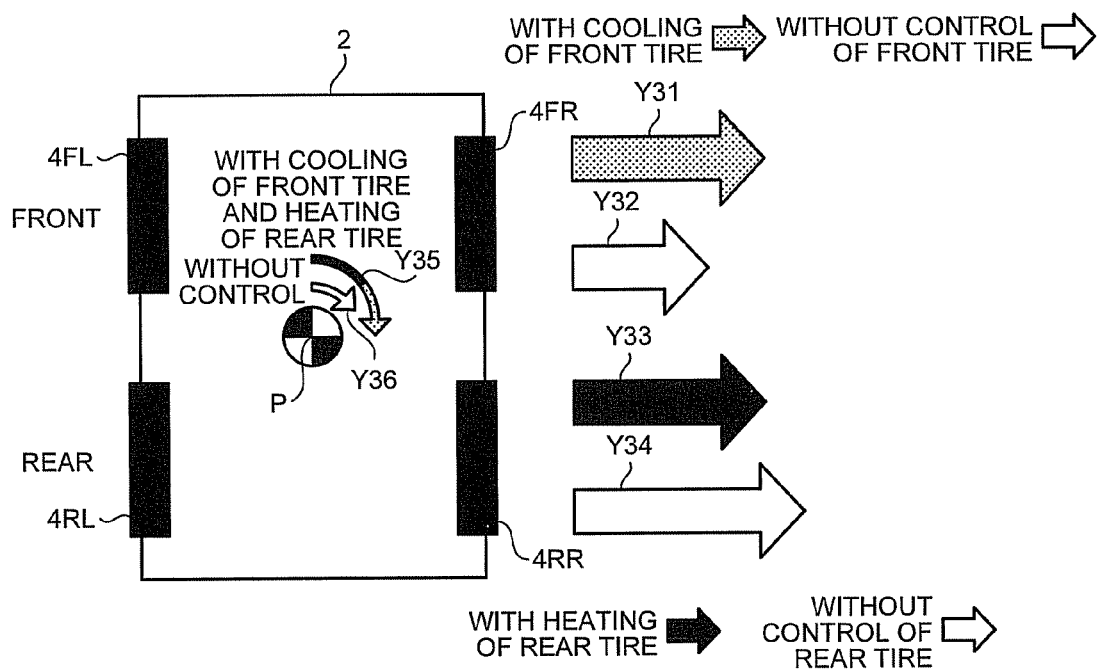
FIG. 10 is a diagram illustrating effects of the tire temperature control according to the second modification.

A second modification of the first embodiment will be described. This modification differs from the above-described first embodiment and first modification in that a tire temperature control concurrently performs cooling of the front tires 4F and heating of the rear tires 4R. FIG. 9 is a flowchart illustrating operations of the tire temperature control according to this modification. FIG. 10 is a diagram illustrating effects of the tire temperature control according to this modification.

Referring to FIG. 9, the tire temperature control of this modification will be described. A control process illustrated in FIG. 9 is repeatedly performed when the vehicle 2 is running. This control process may be performed when the vehicle 2 is stopped. For example, this control process is repeatedly performed at a predetermined interval.

First, at step S21, the ECU 8 determines whether or not the front tire temperature Tf obtained by the temperature sensor for the front wheel 7F is equal to or more than the rear tire temperature Tr obtained by the temperature sensor for the rear wheel 7R. As a result of the determination, in the case where the front tire temperature Tf is determined to be equal to or more than the rear tire temperature Tr (Yes in step S21), the process proceeds to step S22. Otherwise, the process repeats the determination at step S21 (No in step S21).

At step S22, the ECU 8 performs cooling of the front tires 4F and heating of the rear tires 4R. The ECU 8 commands the front wheel temperature control means 6F to cool the front tires 4F while the ECU 8 commands the rear wheel temperature control means 6R to heat the rear tires 4R. The front wheel temperature control means 6F cools the front tires 4F based on the cooling command while the rear wheel temperature control means 6R heats the rear tires 4R based on the heating command.

Subsequently, at step S23, the ECU 8 determines whether or not the front tire temperature Tf is equal to or less than the rear tire temperature Tr. At step S23, it is determined whether or not the front tires 4F is sufficiently cooled and the rear tires 4R is sufficiently heated. As a result of the determination at step S23, in the case where the front tire temperature Tf is determined to be equal to or less than the rear tire temperature Tr (Yes in step S23), the process proceeds to step S24. Otherwise, the process proceeds to step S26 (No in step S23).

At step S24, the ECU 8 determines whether or not the front tire temperature Tf is equal to or less than the first predetermined temperature Tc. At step S24, it is determined whether or not performance changes by changing the front tire temperature Tf is expected. In the case where the front tire temperature Tf is equal to or less than the rear tire temperature Tr and equal to or less than the first predetermined temperature Tc, change in running performance is assumed to have already occurred by the tire temperature control so far. As a result of the determination at step S24, in the case where the front tire temperature Tf is determined to be equal to or less than the first predetermined temperature Tc (Yes in step S24), the process proceeds to step S25. Otherwise, the process proceeds to step S26 (No in step S24).

At step S25, the ECU 8 terminates the cooling and heating of the tires 4. The ECU 8 commands the front wheel temperature control means 6F to terminate the cooling while the ECU 8 commands the rear wheel temperature control means 6R to terminate the heating. The front wheel temperature control means 6F terminates the cooling of the front tires 4F based on the command for termination of the cooling while the rear wheel temperature control means 6R terminates the heating of the rear tires 4R based on the command for termination of the heating. After step S25 is performed, this control process terminates.

At step S26, the ECU 8 determines whether or not the rear tire temperature Tr is equal to or more than the first predetermined temperature Tc. At step S26, it is determined whether or not performance change is expected by changing the rear tire temperature Tr more. In the case where the rear tire temperature Tr is equal to or more than the first predetermined temperature Tc (Yes in S26), change in maneuverability is hardly expected even if the rear tires 4R is heated more. As a result of the determination at step S26, in the case where the rear tire temperature Tr is determined to be equal to or more than the first predetermined temperature Tc (Yes in step S26), the process proceeds to step S27. Otherwise, the process proceeds to step S22 (No in step S26).

At step S27, the ECU 8 terminates the heating of the rear tires 4R and continues cooling of the front tire 4F. The ECU 8 commands the rear wheel temperature control means 6R to terminate the heating while the ECU 8 commands the front wheel temperature control means 6F to perform cooling. The rear wheel temperature control means 6R terminates the heating the rear tires 4R based on the command for termination of the heating while the front wheel temperature control means 6F continues cooling the front tires 4F based on the cooling command. After step S27 is performed, the process proceeds to step S23.

Referring to FIG. 10, advantageous effects of this modification will be described. In FIG. 10, an arrow Y31 indicates the normalized CP of the front tires 4F after cooling by the tire temperature control of this modification. An arrow Y32 indicates the normalized CP of the front tires 4F in the case where the tire temperature control is not performed. An arrow Y33 indicates the normalized CP of the rear tires 4R after heating by the tire temperature control of this modification. An arrow Y34 indicates the normalized CP of the rear tires 4R in the case where the tire temperature control is not performed. Additionally, an arrow Y35 indicates the turning performance of the vehicle 2 in the case where the tire temperature control of this modification is performed. An arrow Y36 indicates the turning performance in the case where the tire temperature control is not performed.

Cooling the front tires 4F and heating the rear tires 4R by the tire temperature control of this modification increases the normalized CP (Y31) of the front tires 4F after cooling, compared with the normalized CP (Y32) of the front tires 4F where the tire temperature control is not performed. The normalized CP (Y33) of the rear tires 4R after heating is decreased, compared with the normalized CP (Y34) of the rear tires 4R where the tire temperature control is not performed. This improves the turning performance Y35 where the tire temperature control is performed, compared with turning performance Y36 where the tire temperature control is not performed.

This modification cools the front tires 4F and heats the rear tires 4R at the same time. This allows adjusting the tire temperature to progress promptly and improves turning performance of the vehicle 2 with a good responsiveness.

Third Modification of the First Embodiment

Figure 11:
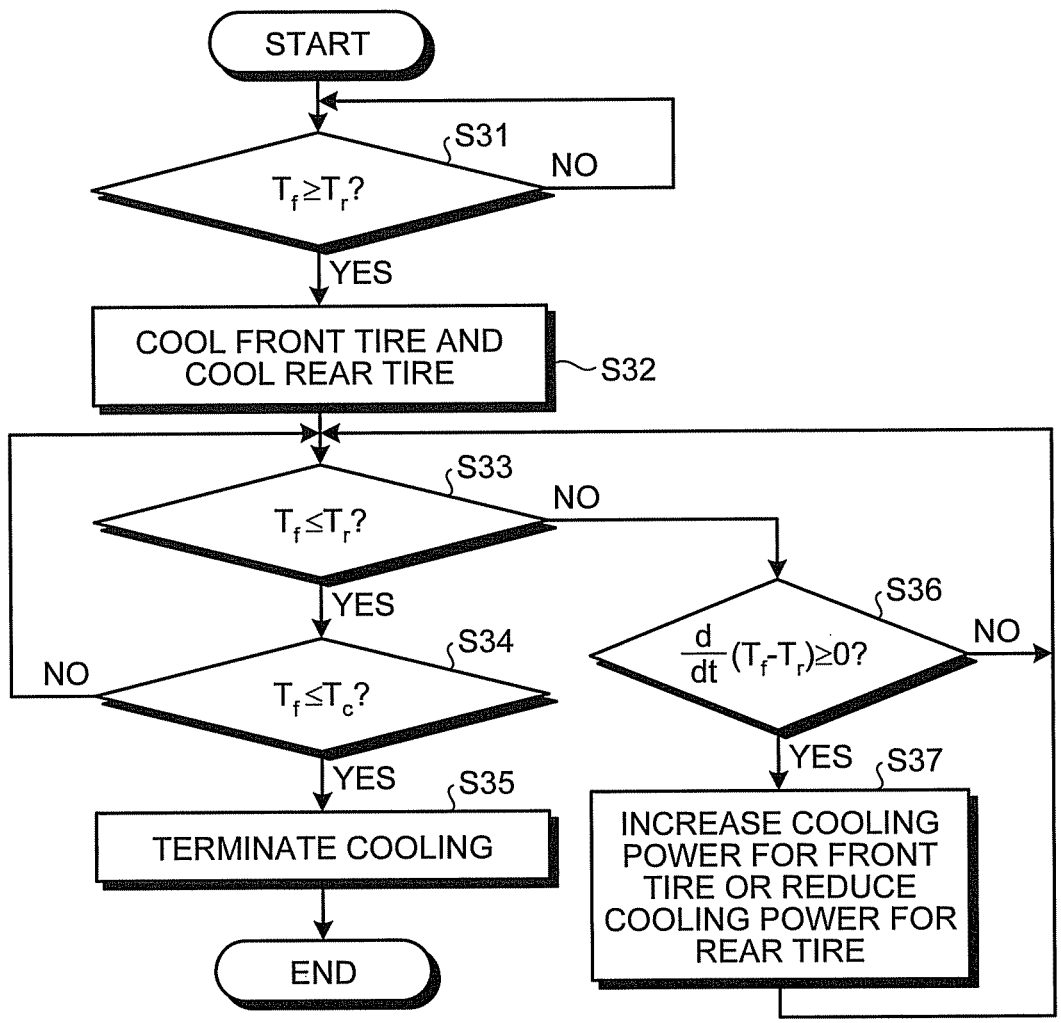
FIG. 11 is a flowchart illustrating operations of a tire temperature control according to a third modification.
Figure 12:
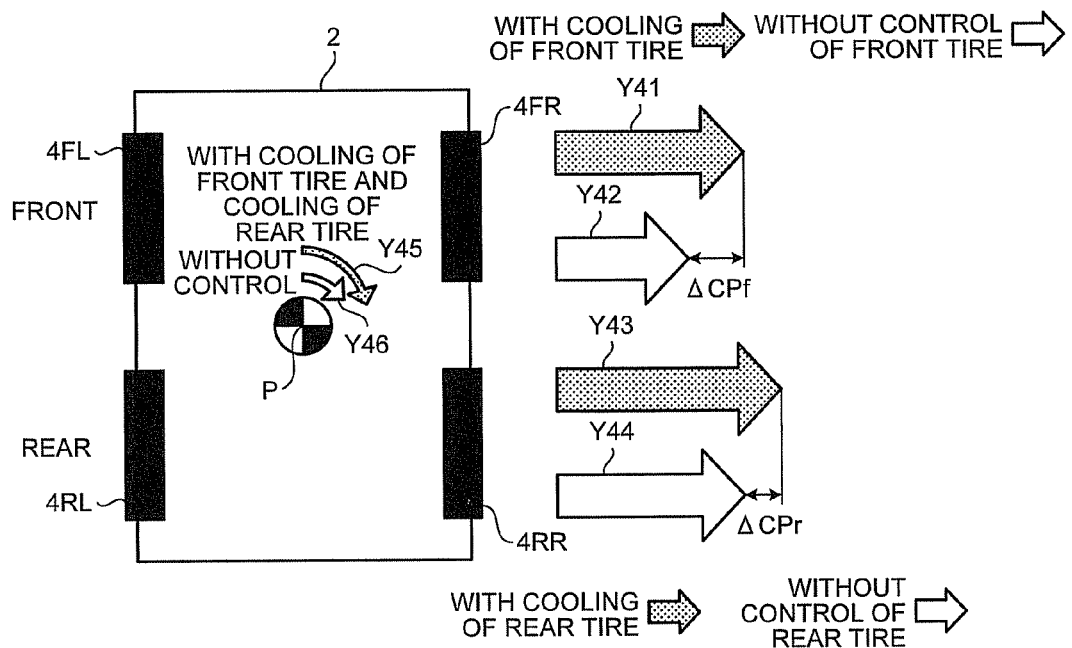
FIG. 12 is a diagram illustrating effects of the tire temperature control according to the third modification.

A third modification of the first embodiment will be described. This modification differs from the above-described first embodiment and respective modifications in that a tire temperature control cools both of the front tires 4F and the rear tires 4R. This modification cools the front tire 4F more strongly than the rear tires 4R, and makes the front tire temperature Tf equal to or less than the rear tire temperature Tr. This improves maneuverability. FIG. 11 is a flowchart illustrating operations of a tire temperature control according to this modification. FIG. 12 is a diagram illustrating effects of the tire temperature control according to this modification.

Referring to FIG. 11, the tire temperature control of this modification will be described. A control process illustrated in FIG. 11 is repeatedly performed when the vehicle 2 is running. This control process may be performed when the vehicle 2 is stopped. For example, this control process is repeatedly performed at a predetermined interval.

First, at step S31, the ECU 8 determines whether or not the front tire temperature Tf is equal to or more than the rear tire temperature Tr. The ECU 8 performs the determination at step S31 based on the front tire temperature Tf obtained by the temperature sensor for the front wheel 7F and the rear tire temperature Tr obtained by the temperature sensor for the rear wheel 7R. As a result of the determination, in the case where the front tire temperature Tf is determined to be equal to or more than the rear tire temperature Tr (Yes in step S31), the process proceeds to step S32. Otherwise, the process repeats the determination at step S31 (No in step S31).

At step S32, the ECU 8 cools the front tires 4F and the rear tires 4R. The ECU 8 commands the front wheel temperature control means 6F and the rear wheel temperature control means 6R to perform cooling. The front wheel temperature control means 6F cools the front tires 4F based on the cooling command while the rear wheel temperature control means 6R cools the rear tires 4R based on the cooling command. When cooling of the tires 4 starts, a degree of cooling the front tires 4F may be larger than a degree of cooling the rear tires 4R.

Subsequently, at step S33, the ECU 8 determines whether or not the front tire temperature Tf is equal to or less than the rear tire temperature Tr. The ECU 8 performs the determination at step S33 based on the latest detection result of the temperature sensor 7. As a result of the determination, in the case where the front tire temperature Tf is determined to be equal to or less than the rear tire temperature Tr (Yes in step S33), the process proceeds to step S34. Otherwise, the process proceeds to step S36 (No in step S33).

At step S34, the ECU 8 determines whether or not the front tire temperature Tf is equal to or less than the first predetermined temperature Tc. At step S34, it is determined whether or not performance change by the tire temperature control is expected. As a result of the determination, in the case where the front tire temperature Tf is determined to be equal to or less than the first predetermined temperature Tc (Yes in step S34), the process proceeds to step S35. Otherwise, the process proceeds to step S33 (No in step S34) to continue cooling the front tires 4F and the rear tires 4R.

At step S35, the ECU 8 terminates the cooling of the front tires 4F and the rear tires 4R. The ECU 8 commands the front wheel temperature control means 6F and the rear wheel temperature control means 6R to terminate the cooling. The front wheel temperature control means 6F terminates the cooling of the front tires 4F based on the command for termination of the cooling while the rear wheel temperature control means 6R terminates the cooling of the rear tires 4R based on the command for termination of the cooling. After step S35 is performed, this control process terminates.

At step S36, the ECU 8 determines whether or not the rear tires 4R is excessively cooled with respect to the front tire 4F. In other words, it is determined whether or not the front tire temperature Tf is decreased relative to the rear tire temperature Tr as desired. The ECU 8 performs the determination at step S36 based on temporal differentiation of a temperature difference (Tf−Tr) between the front tire temperature Tf and the rear tire temperature Tr. In the case where this temporal differentiation is equal to or more than zero (Yes in step S36), the above-described temperature difference (Tf−Tr) is not decreased. This means that the front tire temperature Tf is not decreased relative to the rear tire temperature Tr. That is, a degree of cooling the front tires 4F is lower than a degree of cooling the rear tires 4R. Thus, the rear tires 4R is determined to be excessively cooled. Excessive cooling of the rear tires 4R does not allow the front tire temperature Tf to be equal to or less than the rear tire temperature Tr, thus having difficulty in improving maneuverability.

As a result of the determination at step S36, in the case where the rear tires 4R is determined to be excessively cooled respect to the front tires 4F (Yes in step S36), the process proceeds to step S37. Otherwise, the process proceeds to step S33 (No in step S36).

At step S37, the ECU 8 performs at least one of a high-power cooling of the front tires 4F and a low-power cooling of the rear tires 4R. The ECU 8 commands the front wheel temperature control means 6F to perform the high-power cooling, and/or commands the rear wheel temperature control means 6R to perform the low-power cooling. This makes a degree of cooling the front tires 4F relatively stronger than a degree of cooling the rear tires 4R. After step S37 is performed, the process proceeds to step S33.

Referring to FIG. 12, advantageous effects of this modification will be described. In FIG. 12, an arrow Y41 indicates the normalized CP of the front tires 4F after cooling by the tire temperature control of this modification. An arrow Y42 indicates the normalized CP of the front tires 4F in the case where the tire temperature control is not performed. An arrow Y43 indicates the normalized CP of the rear tires 4R after cooling by the tire temperature control of this modification. An arrow Y44 indicates the normalized CP of the rear tires 4R in the case where the tire temperature control is not performed. Additionally, an arrow Y45 indicates the turning performance in the case where the tire temperature control is performed of this modification. An arrow Y46 indicates the turning performance in the case where the tire temperature control is not performed.

The tire temperature control of this modification decreases the front tire temperature Tf relative to the rear tire temperature Tr. Accordingly, an increased amount ΔCPf of the normalized CP of the front tires 4F by the tire temperature control becomes larger than an increased amount ΔCPr of the normalized CP of the rear tires 4R by the tire temperature control. Accordingly, the tire temperature control of this modification improves maneuverability.

The tire temperature control of this modification cools the front tires 4F and the rear tires 4R. This increases the normalized CP in each of the front tires 4F and the rear tires 4R. This improves stability of the vehicle 2 as an advantageous effect. That is, the tire temperature control of this modification improves maneuverability and ensures stability in the vehicle 2 at the same time.

Second Embodiment

Figure 13:
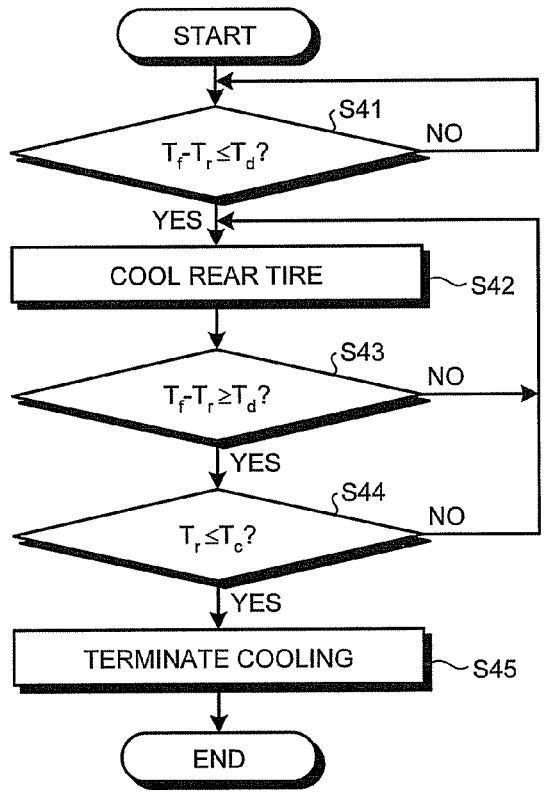
FIG. 13 is a flowchart illustrating operations of a tire temperature control according to a second embodiment.
Figure 14:
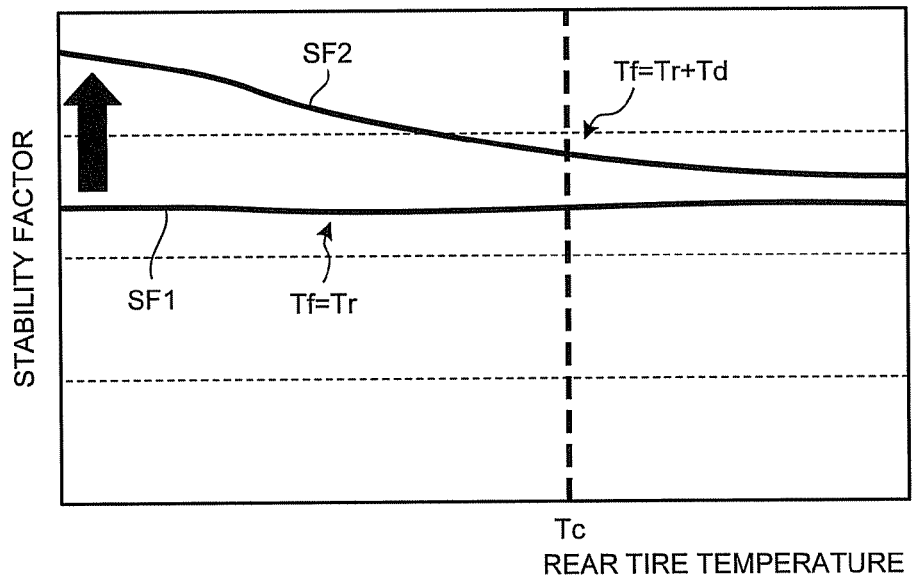
FIG. 14 is a graph illustrating a relationship between a temperature difference between front and rear tires and a stability factor.
Figure 15:
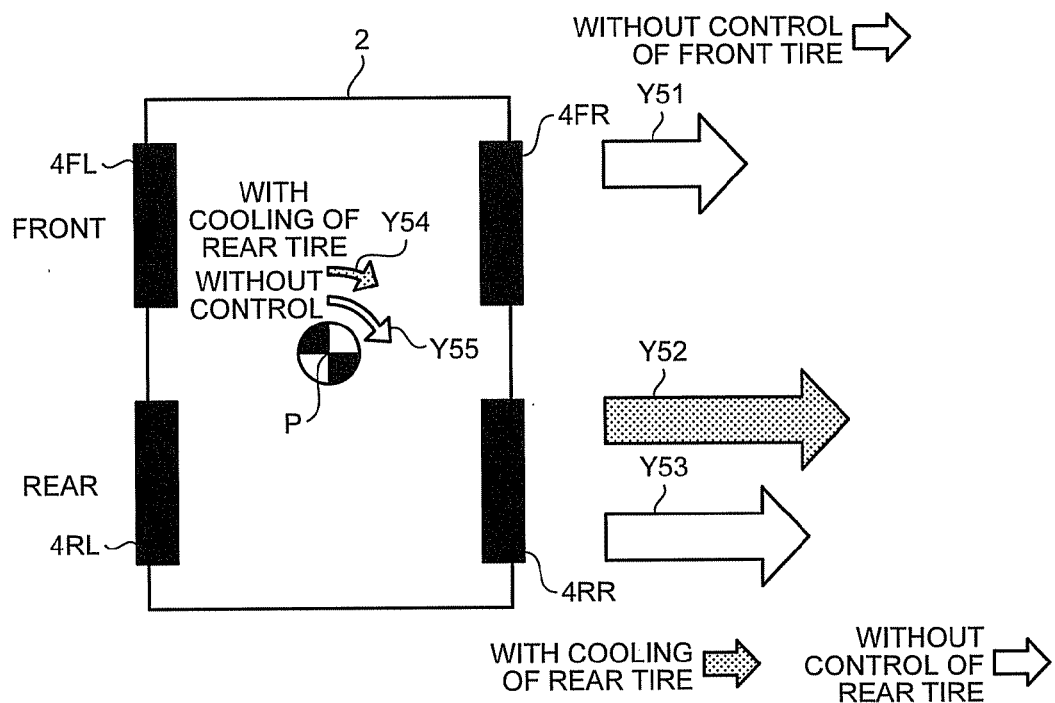
FIG. 15 is a diagram illustrating effects of the tire temperature control according to the second embodiment.

A second embodiment will be described by referring to FIG. 13 to FIG. 15. In the second embodiment, like reference numerals designate corresponding or identical elements to those of the above-described embodiment, and therefore such elements will not be further elaborated here. FIG. 13 is a flowchart illustrating operations of a tire temperature control according to this embodiment. FIG. 14 is a graph illustrating a relationship between a temperature difference between the front and rear tires and a stability factor. FIG. 15 is a diagram illustrating effects of the tire temperature control according to this embodiment.

As illustrated in FIG. 14, the stability factor of the vehicle 2 changes corresponding to the temperature difference (Tf−Tr) between the front tire temperature Tf and the rear tire temperature Tr. In the following description, the temperature difference (Tf−Tr) between the front tire temperature Tf and the rear tire temperature Tr is also described as a "temperature difference between front and rear tires ΔT". The stability factor is one of factors indicating stability of the vehicle 2, and relates to steering characteristics. A large stability factor improves stability of the vehicle 2. For example, this makes straight line stability higher, and reduces deflection during braking.

In FIG. 14, the horizontal axis indicates the rear tire temperature Tr while the vertical axis indicates the stability factor of the vehicle 2. A reference sign SF1 indicates a stability factor where the front tire temperature Tf and the rear tire temperature Tr are the same. A reference sign SF2 indicates a stability factor where the front tire temperature Tf is higher than the rear tire temperature Tr by a predetermined temperature difference Td. The predetermined temperature difference Td is a positive value. In the case where the front tire temperature Tf and the rear tire temperature Tr are the same, the stability factor SF1 is constant regardless of the tire temperature. In other words, in the case where the normalized CP of the front tires 4F and the normalized CP of the rear tires 4R are the same, the stability factor SF1 does not change even if the tire temperature is made to change.

In contrast, making the front tire temperature Tf higher than the rear tire temperature Tr improves the stability factor SF2 compared with a case where the front tire temperature Tf and the rear tire temperature Tr are the same (SF1). The stability factor SF2 changes corresponding to the temperature of the tires 4. As illustrated in FIG. 14, the stability factor SF2 improves as the front tire temperature Tf and the rear tire temperature Tr becomes lower. The larger the temperature difference between front and rear tires ΔT becomes, the larger a difference between the stability factor SF2 and the stability factor SF1 where the front tire temperature Tf and the rear tire temperature Tr are the same becomes (not shown).

This embodiment controls the tire temperature such that the temperature difference between front and rear tires ΔT becomes equal to or more than the predetermined temperature difference Td. For example, the predetermined temperature difference Td of this embodiment is preliminarily determined as a value with a significant difference between the stability factor SF1 where the front tire temperature Tf and the rear tire temperature Tr are the same and the stability factor SF2 after the tire temperature control. In other words, the predetermined temperature difference Td is determined as a value where improvement of stability is expected by performing the tire temperature control. The predetermined temperature difference Td may be constant regardless of a tire temperature before the tire temperature control, or may be variable corresponding to a tire temperature before the tire temperature control.

Referring to FIG. 13, the tire temperature control of the second embodiment will be described. A control process illustrated in FIG. 13 is repeatedly performed when the vehicle 2 is running. This control process may be performed when the vehicle 2 is stopped. For example, this control process is repeatedly performed at a predetermined interval.

First, at step S41, the ECU 8 determines whether or not the temperature difference between front and rear tires ΔT (the front tire temperature Tf−the rear tire temperature Tr) is equal to or less than the predetermined temperature difference Td. The ECU 8 performs the determination at step S41 based on the detection result of the temperature sensor 7. As a result of the determination, in the case where the temperature difference between front and rear tires ΔT is determined to be equal to or less than the predetermined temperature difference Td (Yes in step S41), the process proceeds to step S42. Otherwise, the process repeats the determination at step S41 (No in step S41). In the case where the rear tire temperature Tr is higher than the front tire temperature Tf, that is, in the case where the temperature difference between front and rear tires ΔT is negative, affirmative determination is made at step S41.

At step S42, the ECU 8 cools the rear tires 4R. The ECU 8 commands the rear wheel temperature control means 6R to cool the rear tires 4R. The rear wheel temperature control means 6R cools the rear tires 4R based on the cooling command. Accordingly, the rear wheel temperature control means 6R increases the temperature difference between front and rear tires ΔT.

Subsequently, at step S43, the ECU 8 determines whether or not the temperature difference between front and rear tires ΔT is equal to or more than the predetermined temperature difference Td. At step S43, it is determined whether or not the temperature difference between front and rear tires ΔT is sufficiently generated by cooling the rear tires 4R. The ECU 8 performs the determination at step S43 based on the latest detection result of the temperature sensor 7. As a result of the determination, in the case where the temperature difference between front and rear tires ΔT is determined to be equal to or more than the predetermined temperature difference Td (Yes in step S43), the process proceeds to step S44. Otherwise, the process proceeds to step S42 (No in step S43) to continue cooling the rear tires 4R.

At step S44, the ECU 8 determines whether or not the rear tire temperature Tr is equal to or less than the first predetermined temperature Tc. At step S44, it is determined whether or not performance changes by changing the temperature of the rear tires 4R is expected. As a result of the determination, in the case where the rear tire temperature Tr is determined to be equal to or less than the first predetermined temperature Tc (Yes in step S44), the process proceeds to step S45. Otherwise, the process proceeds to step S42 (No in step S44).

At step S45, the ECU 8 terminates the cooling of the rear tires 4R. The ECU 8 commands the rear wheel temperature control means 6R to terminate the cooling. The rear wheel temperature control means 6R terminates the cooling of the rear tires 4R based on the command for termination of the cooling. After step S45 is performed, this control process terminates.

Referring to FIG. 15, advantageous effects of this embodiment will be described. In FIG. 15, an arrow Y51 indicates the normalized CP of the front tire 4F. An arrow Y52 indicates the normalized CP of the rear tires 4R after cooling by the tire temperature control of this embodiment. An arrow Y53 indicates the normalized CP of the rear tires 4R in the case where the tire temperature control is not performed. Additionally, an arrow Y54 indicates turnability of the vehicle 2 in the case where the tire temperature control of this embodiment is performed. An arrow Y55 indicates a turnability of the vehicle 2 in the case where the tire temperature control is not performed. Lengths of the arrows Y54 and Y55 indicate degrees of turnability around the center of gravity in the vehicle 2, in other words, a turnability in the running direction of the vehicle 2. That is, the arrows Y54 and Y55 with short lengths indicate that stability is high, for example, shaking in straight running is small and deflection during braking does not easily occur.

The tire temperature control of this embodiment makes the temperature control means 6 to cool the rear tires 4R such that the rear tire temperature Tr becomes less than the front tire temperature Tf. Accordingly, the normalized CP (Y52) of the rear tires 4R after cooling is increased, compared with the normalized CP (Y53) of the rear tires 4R where the tire temperature control is not performed. As a result, in the case where the tire temperature control is performed (Y54), the turn of the vehicle 2 does not easily occur compared with the case where the tire temperature control is not performed (Y55). This improves stability. Additionally, the temperature control means 6 not only makes the rear tire temperature Tr less than the front tire temperature Tf, but also makes the temperature difference between front and rear tires ΔT equal to or more than the predetermined temperature difference Td. This ensures sufficient stability of the vehicle 2.

For example, the predetermined temperature difference Td of this embodiment may be determined based on a desired stability factor. That is, a target value of the stability factor may be preliminarily determined. Then, the predetermined temperature difference Td may be determined based on the front tire temperature Tf and the rear tire temperature Tr before the tire temperature control is started. For example, as illustrated in FIG. 14, correspondence relationships between the rear tire temperature Tr and the stability factor for a plurality of temperature differences between front and rear tires ΔT may be preliminarily stored in the ECU 8. Then, the most appropriate temperature difference between front and rear tires ΔT may be selected as the predetermined temperature difference Td to ensure the target stability factor. This allows keeping the stability factor constant regardless of the front tire temperature Tf.

Conventionally, a suspension, vehicle weight distribution, and a similar parameter have been required to be changed in order to change stability of the same vehicle. However, the tire temperature control of this embodiment easily changes vehicle performance without exchanging the components.

First Modification of the Second Embodiment

Figure 16:
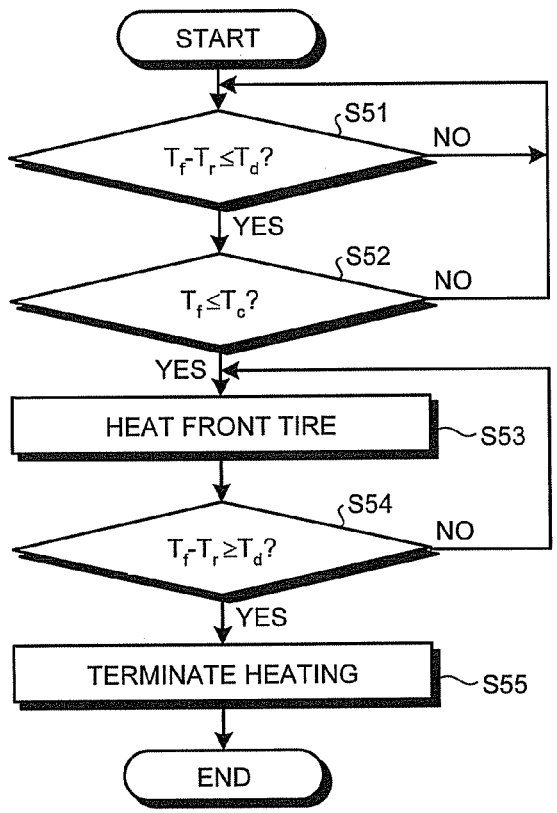
FIG. 16 is a flowchart illustrating operations of a tire temperature control according to a first modification.
Figure 17:
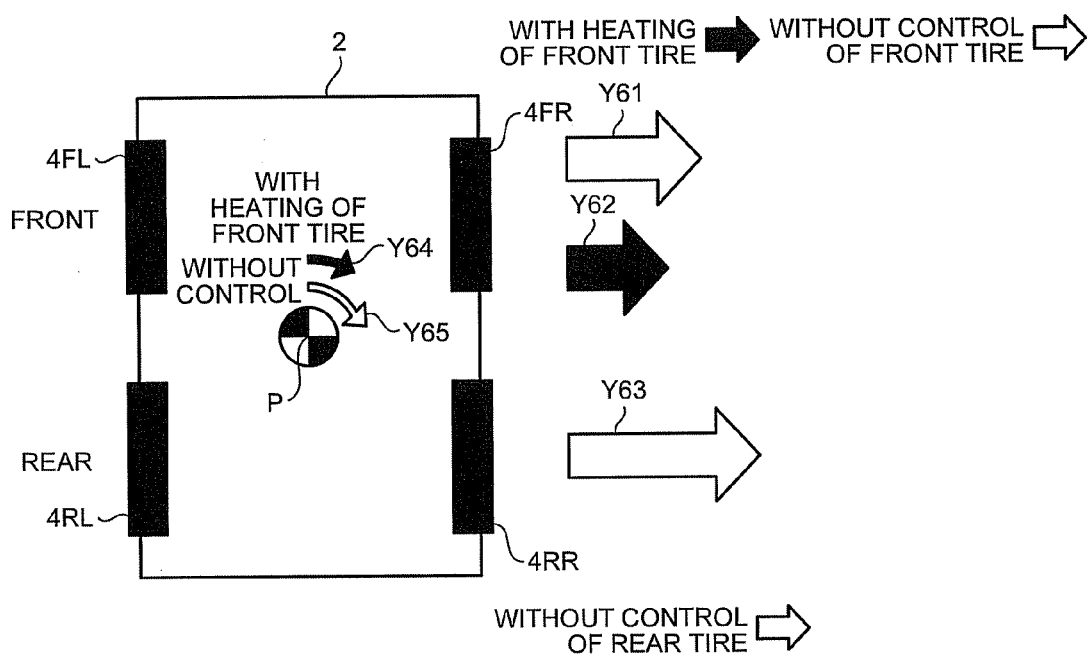
FIG. 17 is a diagram illustrating effects of the tire temperature control according to the first modification.

A first modification of the second embodiment will be described. While in the above-described second embodiment, cooling the rear tires 4R improves stability of the vehicle 2, this modification differs from the above-described second embodiment in that heating the front tires 4F improves stability. FIG. 16 is a flowchart illustrating operations of a tire temperature control according to this modification. FIG. 17 is a diagram illustrating effects of the tire temperature control according to this modification.

Referring to FIG. 16, the tire temperature control of this modification will be described. A control process illustrated in FIG. 16 is repeatedly performed when the vehicle 2 is running. This control process may be performed when the vehicle 2 is stopped. For example, this control process is repeatedly performed at a predetermined interval.

First, at step S51, the ECU 8 determines whether or not the temperature difference between front and rear tires ΔT is equal to or less than the predetermined temperature difference Td. The ECU 8 performs the determination at step S51 based on the detection result of the temperature sensor 7. As a result of the determination, the temperature difference between front and rear tires ΔT is determined to be equal to or less than the predetermined temperature difference Td (Yes in step S51), the process proceeds to step S52. Otherwise, the process repeats the determination at step S51 (No in step S51).

At step S52, the ECU 8 determines whether or not the front tire temperature Tf is equal to or less than the first predetermined temperature Tc. In the case where the front tire temperature Tf is higher than the first predetermined temperature Tc, improvement of stability is hardly expected even if the front tires 4F are heated. As a result of the determination at step S52, in the case where the front tire temperature Tf is determined to be equal to or less than the first predetermined temperature Tc (Yes in step S52), the process proceeds to step S53. Otherwise, the process proceeds to step S51 (No in step S52).

At step S53, the ECU 8 outputs a heating command for the front tires 4F to the front wheel temperature control means 6F. The front wheel temperature control means 6F heats the front tires 4F based on the heating command.

At step S54, the ECU 8 determines whether or not the temperature difference between front and rear tires ΔT is equal to or more than the predetermined temperature difference Td. As a result of the determination based on the detection result of the temperature sensor 7, in the case where the temperature difference between front and rear tires ΔT is determined to be equal to or more than the predetermined temperature difference Td (Yes in step S54), the process proceeds to step S55. Otherwise, the process proceeds to step S53 (No in step S54) to continue heating the front tire 4F.

At step S55, the ECU 8 terminates the heating. The ECU 8 commands the front wheel temperature control means 6F to terminate the heating. The front wheel temperature control means 6F terminates the heating of the front tires 4F based on the command for termination of the heating. After step S55 is performed, this control process terminates.

Referring to FIG. 17, advantageous effects of this modification will be described. In FIG. 17, an arrow Y61 indicates the normalized CP of the front tires 4F in the case where the tire temperature control is not performed. An arrow Y62 indicates the normalized CP of the front tires 4F after heating by the tire temperature control of this modification. An arrow Y63 indicates the normalized CP of the rear tires 4R. Additionally, an arrow Y64 indicates a turnability of the vehicle 2 in the case where the tire temperature control of this modification is performed. An arrow Y65 indicates a turnability of the vehicle 2 in the case where the tire temperature control is not performed.

The tire temperature control of this modification heats the front tires 4F such that the temperature difference between front and rear tires ΔT becomes equal to or more than the predetermined temperature difference Td. Accordingly, the normalized CP (Y62) of the front tires 4F after heating is decreased, compared with the normalized CP (Y61) where the tire temperature control is not performed. As a result, in the case where the tire temperature control is performed (Y64), stability of the vehicle 2 is improved compared with the case where the tire temperature control is not performed (Y65).

In the case where negative determination is made at step S52, the tire temperature control may change into a control that cool the rear tires 4R of the above-described second embodiment (in FIG. 13). That is, heating the front tires 4F or cooling the rear tires 4R may be selected based on the front tire temperature Tf.

Second Modification of the Second Embodiment

Figure 18:
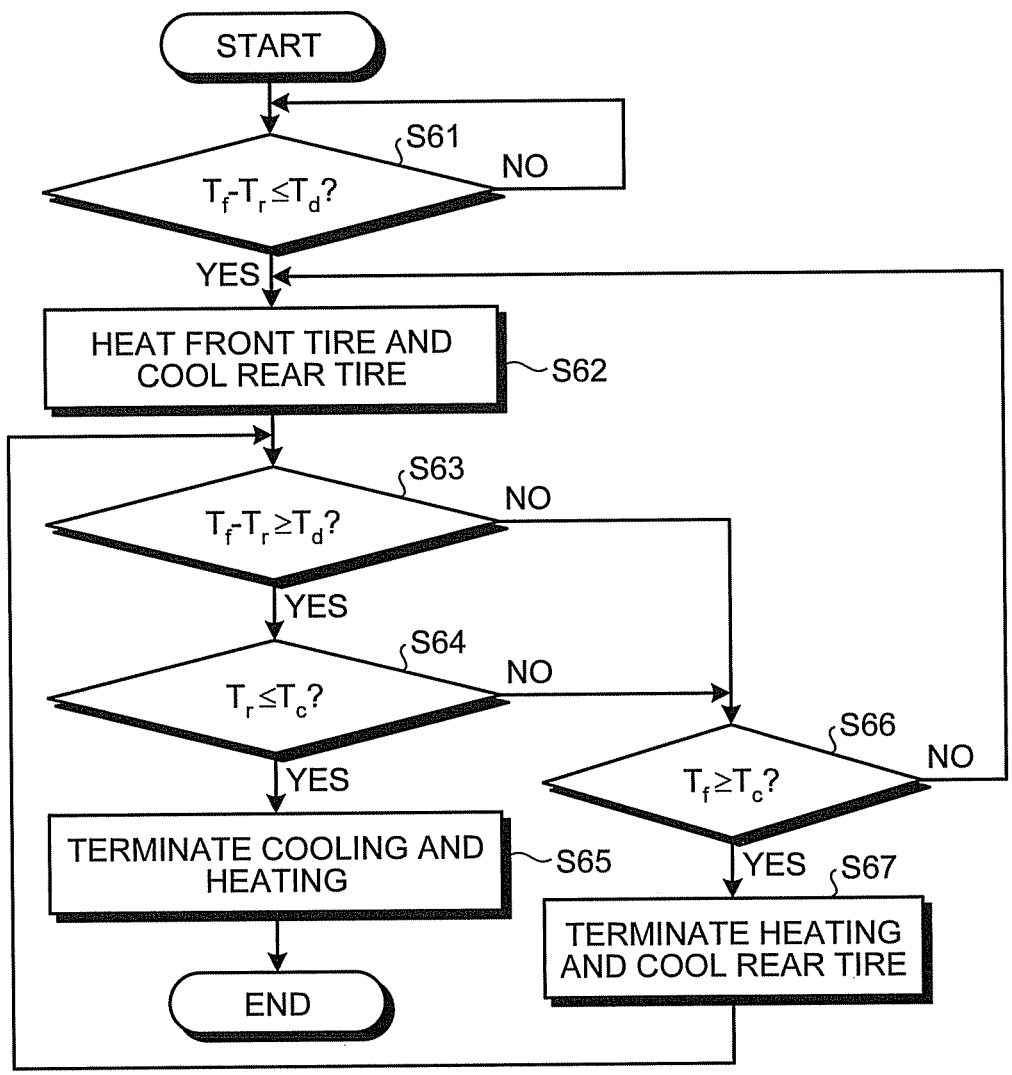
FIG. 18 is a flowchart illustrating operations of a tire temperature control according to a second modification.
Figure 19:
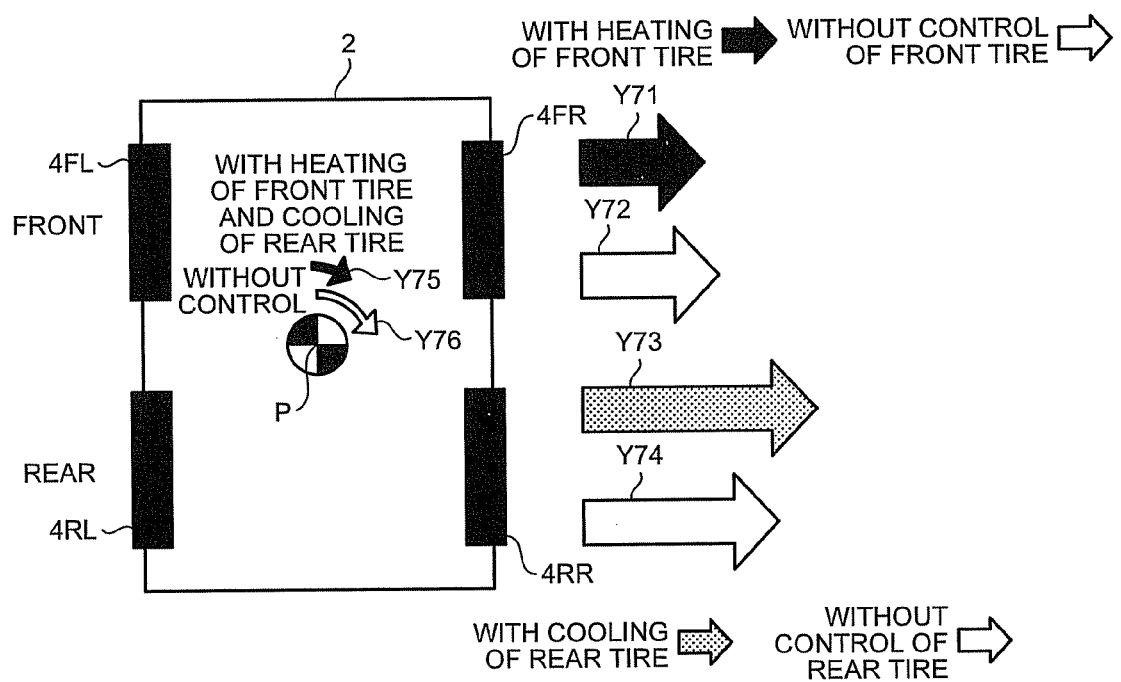
FIG. 19 is a diagram illustrating effects of the tire temperature control according to the second modification.

A second modification of the second embodiment will be described. This modification differs from the above-described second embodiment and first modification of the second embodiment in that heating the front tires 4F and cooling the rear tires 4R improves stability of the vehicle 2. FIG. 18 is a flowchart illustrating operations of the tire temperature control according to this modification. FIG. 19 is a diagram illustrating effects of the tire temperature control according to this modification.

Referring to FIG. 18, the tire temperature control of this modification will be described. A control process illustrated in FIG. 18 is repeatedly performed when the vehicle 2 is running. This control process may be performed when the vehicle 2 is stopped. For example, this control process is repeatedly performed at a predetermined interval.

First, at step S61, the ECU 8 determines whether or not the temperature difference between front and rear tires ΔT is equal to or less than the predetermined temperature difference Td. As a result of the determination based on the detection result of the temperature sensor 7, in the case where the temperature difference between front and rear tires ΔT is determined to be equal to or less than the predetermined temperature difference Td (Yes in step S61), the process proceeds to step S62. Otherwise, the process repeats the determination at step S61 (No in step S61).

At step S62, the ECU 8 outputs a heating command for the front tires 4F and a cooling command for the rear tires 4R. The front wheel temperature control means 6F heats the front tires 4F based on the heating command while the rear wheel temperature control means 6R cools the rear tires 4R based on the cooling command.

Subsequently, at step S63, the ECU 8 determines whether or not the temperature difference between front and rear tires ΔT is equal to or more than the predetermined temperature difference Td. As a result of the determination, in the case where the temperature difference between front and rear tires ΔT is determined to be equal to or more than the predetermined temperature difference Td (Yes in step S63), the process proceeds to step S64. Otherwise, the process proceeds to step S66 (No in step S63).

At step S64, the ECU 8 determines whether or not the rear tire temperature Tr is equal to or less than the first predetermined temperature Tc. As a result of the determination, in the case where the rear tire temperature Tr is determined to be equal to or less than the first predetermined temperature Tc (Yes in step S64), the process proceeds to step S65. Otherwise, the process proceeds to step S66 (No in step S64).

At step S65, the ECU 8 terminates the cooling and heating. The front wheel temperature control means 6F terminates the heating of the front tires 4F based on the command for termination of the heating while the rear wheel temperature control means 6R terminates the cooling of the rear tires 4R based on the command for termination of the cooling. After step S65 is performed, this control process terminates.

At step S66, the ECU 8 determines whether or not the front tire temperature Tf is equal to or more than the first predetermined temperature Tc. In the case where the front tire temperature Tf is equal to or more than the first predetermined temperature Tc, improvement of stability of the vehicle 2 is hardly expected even if the front tire temperature Tf is increased more. As a result of the determination at step S66, in the case where the front tire temperature Tf is determined to be equal to or more than the first predetermined temperature Tc (Yes in step S66), the process proceeds to step S67. Otherwise, the process proceeds to step S62 (No in step S66).

At step S67, the ECU 8 outputs the termination command for heating of the front tires 4F and the cooling command for the rear tires 4R. The front wheel temperature control means 6F terminates the heating of the front tires 4F based on the command for termination of the heating while the rear wheel temperature control means 6R cools the rear tires 4R based on the cooling command. After step S67 is performed, this control process proceeds to step S63.

Referring to FIG. 19, advantageous effects of this modification will be described. In FIG. 19 an arrow Y71 indicates the normalized CP of the front tires 4F after heating by the tire temperature control of this modification. An arrow Y72 indicates the normalized CP of the front tires 4F in the case where the tire temperature control is not performed. An arrow Y73 indicates the normalized CP of the rear tires 4R after cooling by the tire temperature control of this modification. An arrow Y74 indicates the normalized CP of the rear tires 4R in the case where the tire temperature control is not performed. Additionally, an arrow Y75 indicates a turnability of the vehicle 2 in the case where the tire temperature control of this modification is performed. An arrow Y76 indicates a turnability of the vehicle 2 in the case where the tire temperature control is not performed.

The tire temperature control of this modification heats the front tires 4F and cools the rear tires 4R such that the temperature difference between front and rear tires ΔT becomes equal to or more than the predetermined temperature difference Td. Accordingly, the normalized CP (Y71) of the front tires 4F after heating is decreased, compared with the normalized CP (Y72) where the tire temperature control is not performed. The normalized CP (Y73) of the rear tires 4R after cooling is increased, compared with the normalized CP (Y74) where the tire temperature control is not performed. As a result, in the case where the tire temperature control is performed (Y75), stability of the vehicle 2 is improved compared with the case where the tire temperature control is not performed (Y76). With this modification, heating the front tires 4F and cooling the rear tires 4R at the same time promptly completes adjustment of the temperature difference between front and rear tires ΔT, thus allowing control of stability of the vehicle 2 with good responsiveness.

Third Modification of the Second Embodiment

Figure 20:
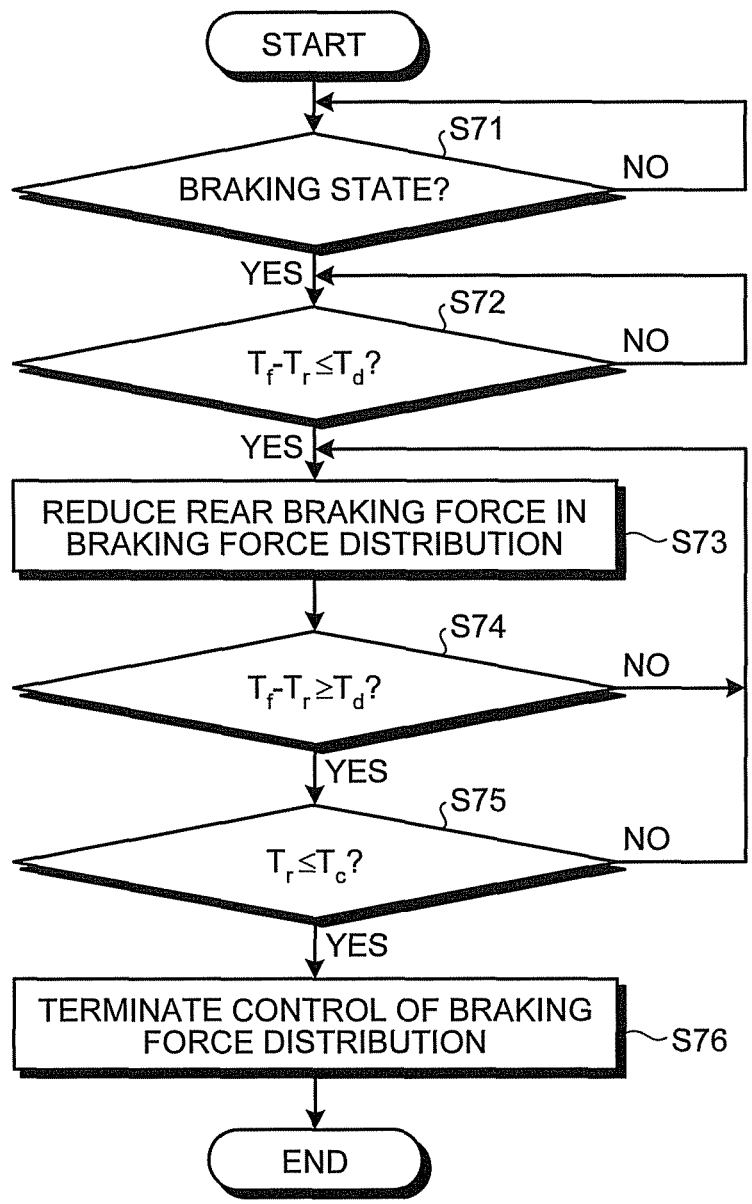
FIG. 20 is a flowchart illustrating operations of a tire temperature control according to a third modification.
Figure 21:
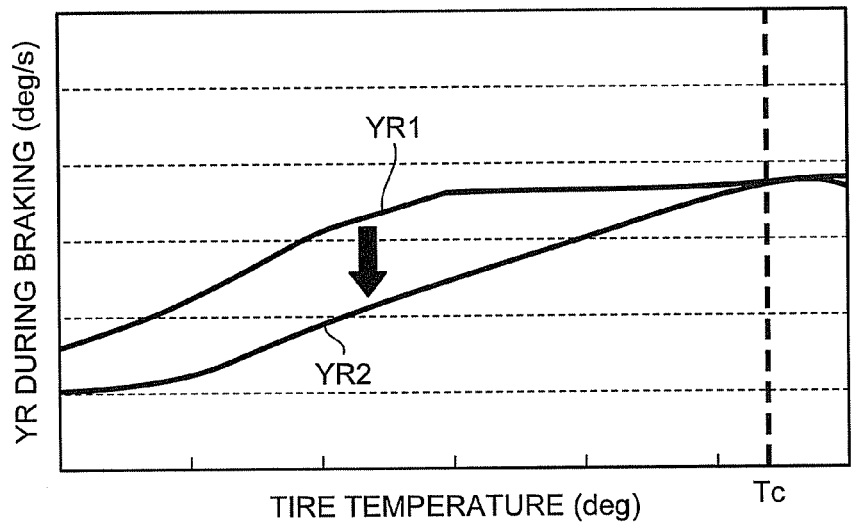
FIG. 21 is a graph illustrating effects of the tire temperature control according to the third modification.

A third modification of the second embodiment will be described. This modification is similar to the above-described second modification of the second embodiment in that the tire temperature control heats the front tires 4F and cools the rear tires 4R to ensure stability of the vehicle 2. In contrast, this modification differs from the second modification in that the tire temperature control is performed during braking and means for controlling the tire temperature is front-rear braking force distribution. FIG. 20 is a flowchart illustrating operations of a tire temperature control according to this modification. FIG. 21 is a diagram illustrating effects of the tire temperature control according to this modification.

In this modification, the temperature control means 6 adjusts proportion of the front-rear braking force distribution to control the temperature of the tires 4. The front wheel temperature control means 6F controls braking forces generated by braking devices of the left front wheel 3FL and the right front wheel 3FR. For example, in the case where the braking device is a hydraulic braking device, the front wheel temperature control means 6F controls the braking force of the front wheel 3F by adjusting hydraulic pressure supplied to the braking device of the front wheel 3F. Similarly, the rear wheel temperature control means 6R controls the braking force of the rear wheel 3R by adjusting hydraulic pressure supplied to the braking device of the rear wheel 3R. The ECU 8 determines distribution between the braking force of the front wheel 3F and the braking force of the rear wheel 3R so as to achieve the requested braking force for the vehicle 2 using the braking force of the front wheel 3F and the braking force of the rear wheel 3R.

Referring to FIG. 20, the tire temperature control of this modification will be described. A control process illustrated in FIG. 20 is repeatedly performed when the vehicle 2 is running. For example, this control process is repeatedly performed at a predetermined interval.

First, at step S71, the ECU 8 determines whether or not the vehicle 2 is in a braking state. The braking state includes a state where brake is operating in the vehicle 2 and a state where braking is requested to the vehicle 2. For example, the ECU 8 performs the determination at step S71 based on a detection result of a sensor that detects driver's operating state for a brake pedal (not shown). This sensor may be, for example, a sensor that detects a brake operation amount (a pedal stroke or a pedal depressing force) or a switch that detects a brake ON state. In the case where the detection result of the sensor indicating that brake is operating or the detection result of the sensor indicating that braking is requested is input, the ECU 8 makes affirmative determination at step S71.

The ECU 8 may also determine that the vehicle 2 is in a braking state in the case where brake is operating in a running control of the vehicle 2 or in the case where the braking force is requested by the running control. As one example, in the case where a follow-up control is performed on a preceding vehicle in the vehicle 2, affirmative determination may be made at step S71 if the braking force is requested based on a distance from the preceding vehicle.

As a result of the determination at step S71, in the case where the vehicle 2 is determined to be in a braking state (Yes in step S71), the process proceeds to step S72. Otherwise, the determination at step S71 is repeated (No in step S71).

At step S72, the ECU 8 determines whether or not the temperature difference between front and rear tires ΔT is equal to or less than the predetermined temperature difference Td. In the case where the temperature difference between front and rear tires ΔT is determined to be equal to or less than the predetermined temperature difference Td based on the detection result of the temperature sensor 7 (Yes in step S72), the process proceeds to step S73. Otherwise, the determination at step S72 is repeated (No in step S72).

At step S73, the ECU 8 reduces the rear braking force in the braking force distribution. The ECU 8 reduces the braking force of the rear wheel 3R in the braking force distribution while increasing the braking force of the front wheel 3F in the braking force distribution. The ECU 8 outputs the target braking force of the front wheel 3F after changing the braking force distribution to the front wheel temperature control means 6F while outputting the target braking force of the rear wheel 3R to the rear wheel temperature control means 6R. The front wheel temperature control means 6F controls hydraulic pressure to be supplied to the braking device of the front wheel 3F so as to achieve the target braking force of the front wheel 3F obtained from the ECU 8. The rear wheel temperature control means 6R controls the hydraulic pressure to be supplied to the braking device of the rear wheel 3R so as to achieve the target braking force of the rear wheel 3R obtained from the ECU 8.

Increasing the braking force of the front tires 4F in the braking force distribution so as to increasing load enhances increase in front tire temperature Tf. Reducing the braking force of the rear tires 4R in the braking force distribution so as to reduce load reduces the rear tire temperature Tr.

Subsequently, at step S74, the ECU 8 determines whether or not the temperature difference between front and rear tires ΔT is equal to or more than the predetermined temperature difference Td. At step S74, it is determined whether or not a sufficient temperature difference between front and rear tires ΔT is generated by reducing the load on the rear tires 4R. As a result of the determination, in the case where the temperature difference between front and rear tires ΔT is determined to be equal to or more than the predetermined temperature difference Td (Yes in step S74), the process proceeds to step S75. Otherwise, the process proceeds to step S73 (No in step S74).

At step S75, the ECU 8 determines whether or not the rear tire temperature Tr is equal to or less than the first predetermined temperature Tc. As a result of the determination, in the case where the rear tire temperature Tr is determined to be equal to or less than the first predetermined temperature Tc (Yes in step S75), the process proceeds to step S76. Otherwise, the process proceeds to step S73 (No in step S75).

At step S76, the ECU 8 terminates the control of the braking force distribution. The ECU 8 restores the front-rear braking force distribution to the predetermined braking force distribution. For example, the ECU 8 determines the target braking forces of the front wheel 3F and the rear wheel 3R based on the braking force distribution before the tire temperature control of this modification started, and outputs the respective target braking forces to the front wheel temperature control means 6F and the rear wheel temperature control means 6R. After step S76 is performed, this control process terminates.

Referring to FIG. 21, advantageous effects of this modification will be described. In FIG. 21 the horizontal axis indicates the tire temperature while the vertical axis indicates yaw rate during braking. FIG. 21 illustrates yaw rate of the vehicle 2 when the vehicle 2 brakes in straight running. A reference sign YR1 denotes the yaw rate in the case where the tire temperature control is not performed, that is, in the case where, for example, the front tire temperature Tf and the rear tire temperature Tr are the same. A reference sign YR2 denotes the yaw rate after the tire temperature control is performed with the braking force distribution of this modification. The yaw rate YR2 in the case where the tire temperature control is performed is plotted with reference to the rear tire temperature Tr. That is, the yaw rate YR1 and the yaw rate YR2 have the same rear tire temperatures Tr and different front tire temperatures Tf.

As illustrated in FIG. 21, the tire temperature control of this modification with the braking force distribution improves stability of the vehicle 2 and reduces the yaw rate of the vehicle 2 during braking.

The adjustment of the tire force for controlling the tire temperature is not limited to distributing the braking forces. For example, the tire temperature may be controlled by adjusting the tire force using distributing the driving forces on front-rear wheels. For example, the control may reduce the rear braking force of the rear tires 4R in the braking force distribution in the case where the control increases the front tire temperature Tf or decreases the rear tire temperature Tr.

The tire temperature control by adjusting the braking force distribution or the driving force distribution of the front-rear wheels may be performed as means for controlling the tire temperature in each of the embodiments and the modifications other than this modification.

Third Embodiment

Figure 22:
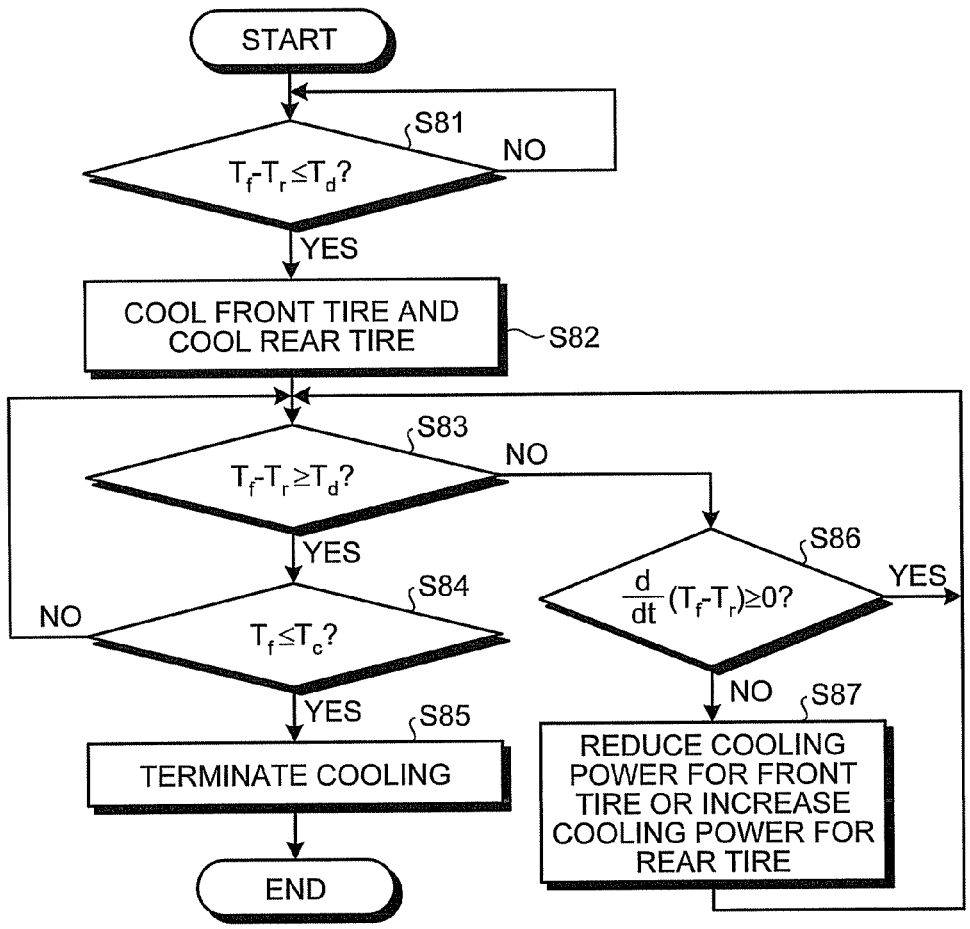
FIG. 22 is a flowchart illustrating operations of a tire temperature control according to a third embodiment.

A third embodiment will be described by referring to FIG. 3, FIG. 14, and FIG. 22. In the third embodiment, like reference numerals designate corresponding or identical elements to those of the above-described embodiment, and therefore such elements will not be further elaborated here. FIG. 22 is a flowchart illustrating operations of a tire temperature control according to this embodiment.

The vehicle performance includes, for example, fuel economy and a stopping distance in addition to the maneuverability and the stability, which are described in each embodiment. In these vehicle performances, one vehicle performance is incompatible with another vehicle performance. For example, improving one vehicle performance reduces the other vehicle performance. When compensating such incompatibility, for example, by control at the vehicle side, it is difficult to significantly reduce the incompatibility. In this embodiment, the tire temperature control ensures the compatibility with the incompatible performances, and improves total vehicle performance. The tire temperature control of this embodiment allows, for example, a tire temperature control that give priority to desired performance for each vehicle or each type of a vehicle, which is a technique with a high degree of freedom.

As described below, the tire temperature control that improves maneuverability and the tire temperature control that improves stability may have preferred tire temperatures that conflicts with each other. From the aspect of improving maneuverability, as described by referring to FIG. 3, the normalized CP of the front tires 4F is preferred to be higher. In other words, the lower front tire temperature Tf is preferred from the aspect of improving maneuverability. On the other hand, from the aspect of improving stability, as described by referring to FIG. 14, the stability factor is preferred to be higher. That is, the normalized CP of the rear tires 4R is preferred to be higher than the normalized CP of the front tire 4F. That is, decreasing the rear tire temperature Tr compared with the front tire temperature Tf is preferred from the aspect of improving stability. The first predetermined temperature Tc related to the stability factor illustrated in FIG. 14 is a value determined depending on a degree of change in normalized CP with respect to temperature change. Thus, this first predetermined temperature Tc may be the same temperature as the first predetermined temperature Tc illustrated in FIG. 3.

In this embodiment, the tire temperature control is performed to improve the compatibility between stability and maneuverability. Specifically, the temperature control means 6 cools the front tires 4F and the rear tires 4R and controls the tire temperature such that the temperature difference between front and rear tires ΔT becomes equal to or more than the predetermined temperature difference Td. The predetermined temperature difference Td is made to be a temperature difference required for ensuring stability of the vehicle 2.

Referring to FIG. 22, the tire temperature control of this embodiment will be described. A control process illustrated in FIG. 22 is repeatedly performed when the vehicle 2 is running. This control process may be performed when the vehicle 2 is stopped. For example, this control process is repeatedly performed at a predetermined interval.

First, at step S81, the ECU 8 determines whether or not the temperature difference between front and rear tires ΔT is equal to or less than the predetermined temperature difference Td. The ECU 8 performs the determination at step S81 based on the detection result of the temperature sensor 7. As a result of the determination, in the case where the temperature difference between front and rear tires ΔT is determined to be equal to or less than the predetermined temperature difference Td (Yes in step S81), the process proceeds to step S82. Otherwise, the process repeats the determination at step S81 (No in step S81).

At step S82, the ECU 8 cools the front tires 4F and the rear tires 4R. The ECU 8 commands the front wheel temperature control means 6F and the rear wheel temperature control means 6R to cool the tires 4. The front wheel temperature control means 6F cools the front tires 4F based on the cooling command while the rear wheel temperature control means 6R cools the rear tires 4R based on the cooling command.

At step S83, the ECU 8 determines whether or not the temperature difference between front and rear tires ΔT is equal to or more than the predetermined temperature difference Td. As a result of the determination, in the case where the temperature difference between front and rear tires ΔT is determined to be equal to or more than the predetermined temperature difference Td (Yes in step S83), the process proceeds to step S84. Otherwise, the process proceeds to step S86 (No in step S83).

At step S84, the ECU 8 determines whether or not the front tire temperature Tf is equal to or less than the first predetermined temperature Tc. As a result of the determination, in the case where the front tire temperature Tf is determined to be equal to or less than the first predetermined temperature Tc (Yes in step S84), the process proceeds to step S85. Otherwise, the process proceeds to step S83 (No in step S84).

At step S85, the ECU 8 terminates the cooling. The ECU 8 commands the front wheel temperature control means 6F and the rear wheel temperature control means 6R to terminate the cooling. The front wheel temperature control means 6F terminates the cooling of the front tires 4F based on the command for termination of the cooling while the rear wheel temperature control means 6R terminates the cooling of the rear tires 4R based on the command for termination of the cooling. After step S85 is performed, this control process terminates.

At step S86, the ECU 8 determines whether or not the front tires 4F are excessively cooled with respect to the rear tires 4R. The ECU 8 performs the determination at step S86 based on the temporal differentiation of the temperature difference between front and rear tires ΔT. Excessive cooling of the front tires 4F does not allow the temperature difference between front and rear tires ΔT to be equal to or more than the predetermined temperature difference Td. As a result of the determination at step S86, in the case where the front tires 4F are determined to be excessively cooled with respect to the rear tires 4R (No in step S86), the process proceeds to step S87. Otherwise, the process proceeds to step S83 (Yes in step S86).

At step S87, the ECU 8 reduces cooling power for the front tires 4F and/or increases cooling power for the rear tires 4R. The ECU 8 commands the front wheel temperature control means 6F to reduce the cooling power and/or commands the rear wheel temperature control means 6R to increase the cooling power. After step S87 is performed, the process proceeds to step S83.

The tire temperature control of this embodiment cools both of the front tires 4F and the rear tires 4R. Decreasing the front tire temperature Tf improves controllability (turning performance). The tire temperature control is performed such that the temperature difference between front and rear tires ΔT becomes equal to or more than the predetermined temperature difference Td. This ensures running stability of the vehicle 2. Thus, this embodiment ensures the compatibility between stability and maneuverability of the vehicle 2.

The front tire temperature Tf and the rear tire temperature Tr that are targeted in the tire temperature control are not limited to those described by referring to FIG. 22. For example, the target tire temperature may be determined corresponding to performance with high priority such as stability or maneuverability. This priority may be variable, for example, corresponding to running environment, a running mode, and a similar parameter. The running environment includes, for example, slope of a runway, ambient temperature, a road surface temperature, weather, a curve, a highway, and a similar parameter. The running mode includes, for example, a fuel economy priority mode with high priority to fuel economy, a sports mode that is appropriate for sports running, and a similar mode.

In the case where maneuverability has high priority, the front tire temperature Tf and the rear tire temperature Tr may be cooled to lower temperatures compared with the case where maneuverability has low priority, or the predetermined temperature difference Td may be decreased. In the case where stability has high priority, the predetermined temperature difference Td may be larger compared with the case where stability has low priority.

Fourth Embodiment

A fourth embodiment will be described by referring to FIG. 23 to FIG. 26. In the fourth embodiment, like reference numerals designate corresponding or identical elements to those of the above-described embodiment, and therefore such elements will not be further elaborated here. This embodiment performs the tire temperature control to ensure the compatibility between two performances of fuel economy and stopping sight distance.

Figure 23:
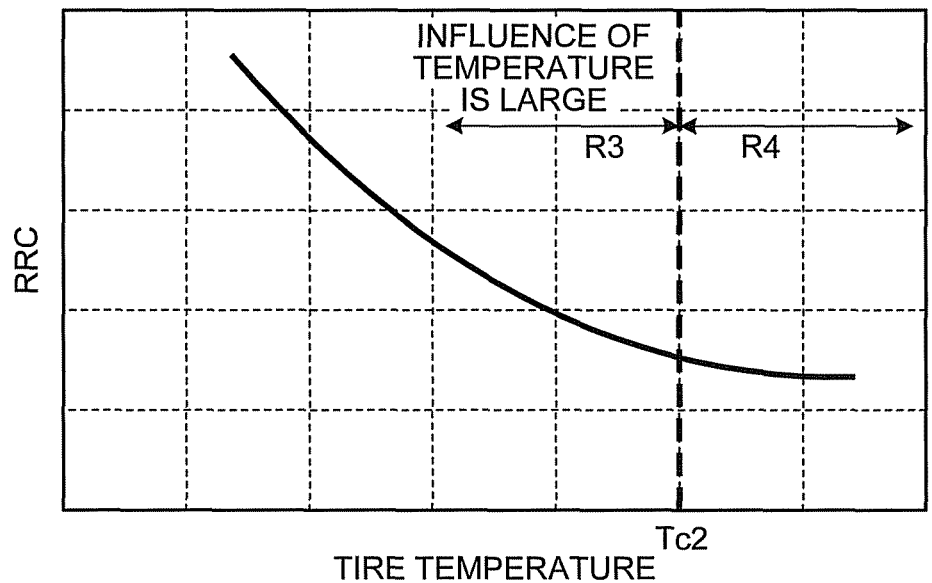
FIG. 23 is a graph illustrating a correspondence relationship between a tire temperature and a rolling resistance coefficient.
Figure 24:
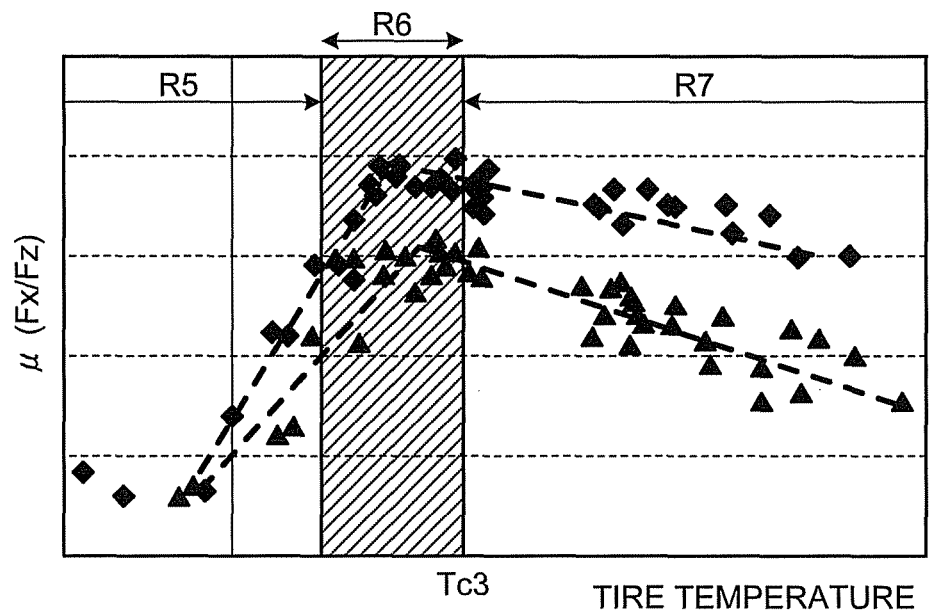
FIG. 24 is a graph illustrating a correspondence relationship between a tire temperature and a friction coefficient.

FIG. 23 is a graph illustrating a correspondence relationship between a tire temperature and a rolling resistance coefficient of the tires 4. FIG. 24 is a graph illustrating a correspondence relationship between a tire temperature and a friction coefficient of the tires 4. In FIG. 23, the horizontal axis indicates the tire temperature while the vertical axis indicates rolling resistance coefficient (RRC) of the tires 4. The rolling resistance coefficient of the tires 4 affects fuel economy of the vehicle 2. That is, FIG. 23 illustrates temperature characteristics related to fuel economy of the vehicle 2. The rolling resistance coefficient decreases with increasing the tire temperature. However, when the tire temperature reaches equal to or more than a certain temperature, the rolling resistance coefficient changes slightly with respect to the increase in the tire temperature. A reference sign Tc2 denotes the second predetermined temperature as a boundary between a third temperature region R3 and a fourth temperature region R4. In the third temperature region R3, influence of the tire temperature with respect to the rolling resistance coefficient is large. In the fourth temperature region R4, influence of the tire temperature with respect to the rolling resistance coefficient is small. In the following description, the second predetermined temperature Tc2 is also described as a "predetermined temperature for fuel economy Tc2".

The fuel economy of the vehicle 2 improves as the rolling resistance coefficient becomes smaller. Thus, from the aspect of improving the fuel economy, the temperature of the tires 4 is preferred to be higher. However, in the fourth temperature region R4, the rolling resistance coefficient changes slightly with respect to change in temperature of the tires 4. Thus, improvement of the fuel economy is hardly expected even if the tire temperature is increased exceeding the predetermined temperature for fuel economy Tc2.

In FIG. 24, the horizontal axis indicates the tire temperature while the vertical axis indicates friction coefficient μ. FIG. 24 illustrates a relationship between the tire temperature and the friction coefficient μ for different two types of tires. FIG. 24 illustrates the temperature characteristics of the tires 4 related to the friction coefficient μ of the tires 4. The friction coefficient μ of the tires 4 becomes largest in a sixth temperature region R6. In a fifth temperature region R5 at lower temperature side than the sixth temperature region R6, the friction coefficient μ decreases with decreasing the tire temperature. In a seventh temperature region R7 at higher temperature side than the sixth temperature region R6, the friction coefficient μ decreases with increasing the tire temperature. A decreased amount (an amount of gradient) of the friction coefficient μ with respect to increase by unit temperature in the seventh temperature region R7 is smaller than a decreased amount (an amount of gradient) of the friction coefficient μA with respect to decrease by unit temperature in the fifth temperature region R5. That is, in the seventh temperature region R7, the friction coefficient μ is not affected by the tire temperature as much as in the fifth temperature region R5.

The stopping distance during braking becomes shorter as the friction coefficient μ becomes higher. Thus, setting the tire temperature to a temperature in the sixth temperature region R6 reduces the stopping sight distance. The temperature indicated by the reference sign Tc3 is a third predetermined temperature determined as an upper limit of the sixth temperature region R6. In the following description, the third predetermined temperature Tc3 is also described as a "predetermined temperature for stopping Tc3".

In this embodiment, the ECU 8 performs the tire temperature control in the following three patterns.

(1) a first pattern expressed by the predetermined temperature for fuel economy Tc2>the predetermined temperature for stopping Tc3

(2) a second pattern expressed by the predetermined temperature for fuel economy Tc2≈the predetermined temperature for stopping Tc3

(3) a third pattern expressed by the predetermined temperature for fuel economy Tc2<the predetermined temperature for stopping Tc3

(First Pattern)

Figure 25:
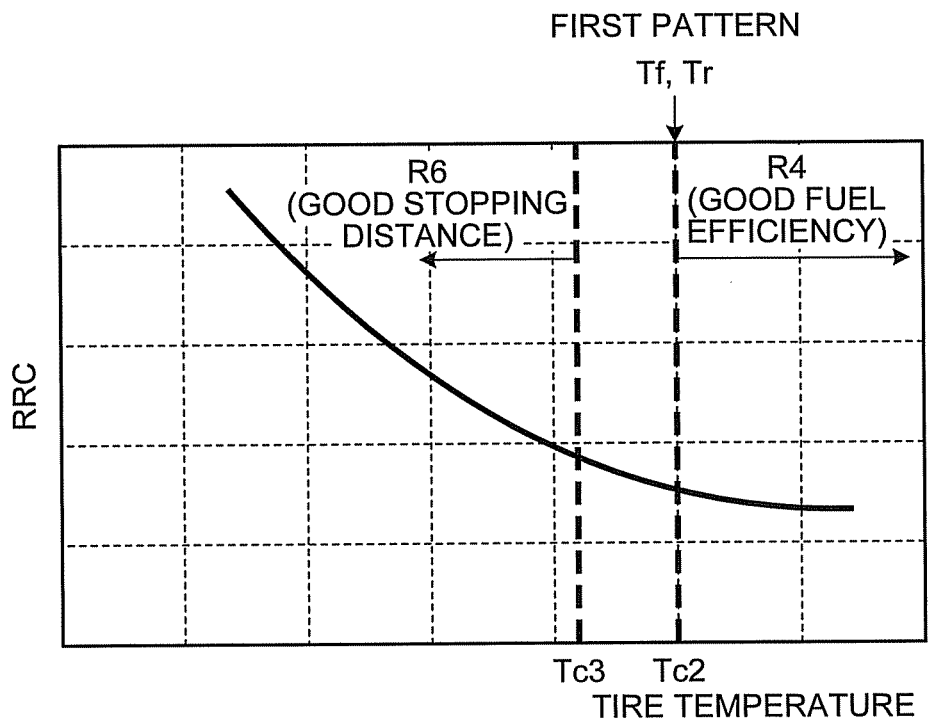
FIG. 25 is a graph illustrating respective predetermined temperatures of a first pattern according to a fourth embodiment.

FIG. 25 is a graph illustrating respective predetermined temperatures of the first pattern. FIG. 25 illustrates the predetermined temperature for stopping Tc3 in the case of the first pattern that is plotted in the graph of the rolling resistance coefficient in FIG. 23. In the first pattern where the predetermined temperature for fuel economy Tc2 is larger than the predetermined temperature for stopping Tc3, the fourth temperature region R4 where the fuel economy becomes best and the sixth temperature region R6 where the stopping distance can be short do not overlap each other. The ECU 8 sets the target temperatures of the front tire temperature Tf and the rear tire temperature Tr to the predetermined temperature for fuel economy Tc2 in the case of the first pattern. The ECU 8 controls the front wheel temperature control means 6F and the rear wheel temperature control means 6R to make the front tire temperature Tf and the rear tire temperature Tr to be the predetermined temperature for fuel economy Tc2. This improves fuel economy and ensures stopping distance performance.

In the case where the stopping distance has high priority, the front tire temperature Tf may be set to be the predetermined temperature for stopping Tc3 and the rear tire temperature Tr may be set to the predetermined temperature for fuel economy Tc2.

(Second Pattern)

In the second pattern where the predetermined temperature for fuel economy Tc2 and the predetermined temperature for stopping Tc3 approximate each other, the ECU 8 sets the target temperatures of the front tire temperature Tf and the rear tire temperature Tr to the predetermined temperature for fuel economy Tc2. This allows making the tire temperature to be a temperature where both of the fuel economy performance and the stopping distance performance are best. The case where "the predetermined temperature for fuel economy Tc2 and the predetermined temperature for stopping Tc3 approximate each other" includes the case where the predetermined temperature for fuel economy Tc2 and the predetermined temperature for stopping Tc3 are the same, and indicates that the predetermined temperature for fuel economy Tc2 is a value close to the predetermined temperature for stopping Tc3.

(Third Pattern)

Figure 26:
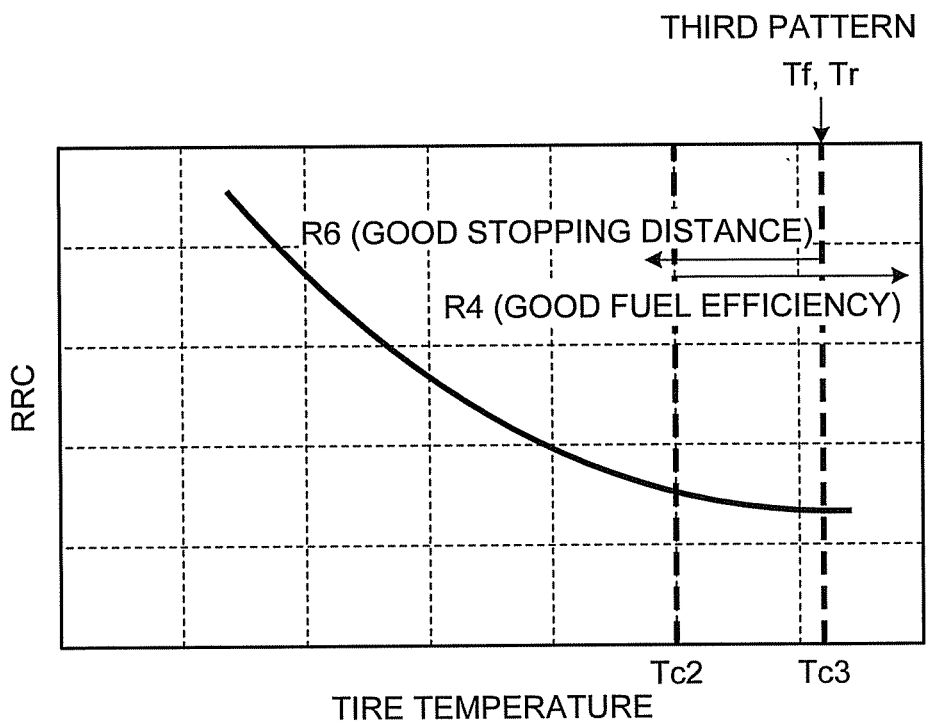
FIG. 26 is a graph illustrating respective predetermined temperatures of a third pattern according to the fourth embodiment.

FIG. 26 is a graph illustrating respective predetermined temperatures of the third pattern. FIG. 26 illustrates the predetermined temperature for stopping Tc3 in the case of the third pattern plotted in FIG. 23. In the third pattern where the predetermined temperature for fuel economy Tc2 is smaller than the predetermined temperature for stopping Tc3, the fourth temperature region R4 where the fuel economy becomes best and the sixth temperature region R6 where the stopping distance can be short overlap each other. The ECU 8 sets the target temperatures of the front tire temperature Tf and the rear tire temperature Tr to the predetermined temperature for stopping Tc3. This ensures maximized fuel economy and satisfactory stopping distance performance at the same time.

In the first pattern to the third pattern of this embodiment, the front tire temperature Tf may be equal to or less than the first predetermined temperature Tc.

Fifth Embodiment

A fifth embodiment will be described by referring to FIG. 27 and FIG. 28. In the fifth embodiment, like reference numerals designate corresponding or identical elements to those of the above-described embodiment, and therefore such elements will not be further elaborated here. In this embodiment, the tire temperature control is performed to ensure the compatibility between two performances of fuel economy and stability in the vehicle 2.

As described by referring to FIG. 14, from the aspect of improving stability, the stability factor is preferred to be larger. That is, decreasing the rear tire temperature Tr with respect to the front tire temperature Tf is preferred from the aspect of improving stability. It is preferred that the tire temperature not be higher than the first predetermined temperature Tc. From the aspect of improving fuel economy, as described by referring to FIG. 23, it is preferred to make the temperature of the tires 4 higher is preferred, that is, it is preferred to make the rolling resistance coefficient lower.

In this embodiment, the ECU 8 performs the tire temperature control in the following two patterns.

(1) a first pattern expressed by the first predetermined temperature Tc>the predetermined temperature for fuel economy Tc2

(2) a second pattern expressed by the first predetermined temperature Tc≤the predetermined temperature for fuel economy Tc2

(First Pattern)

Figure 27:
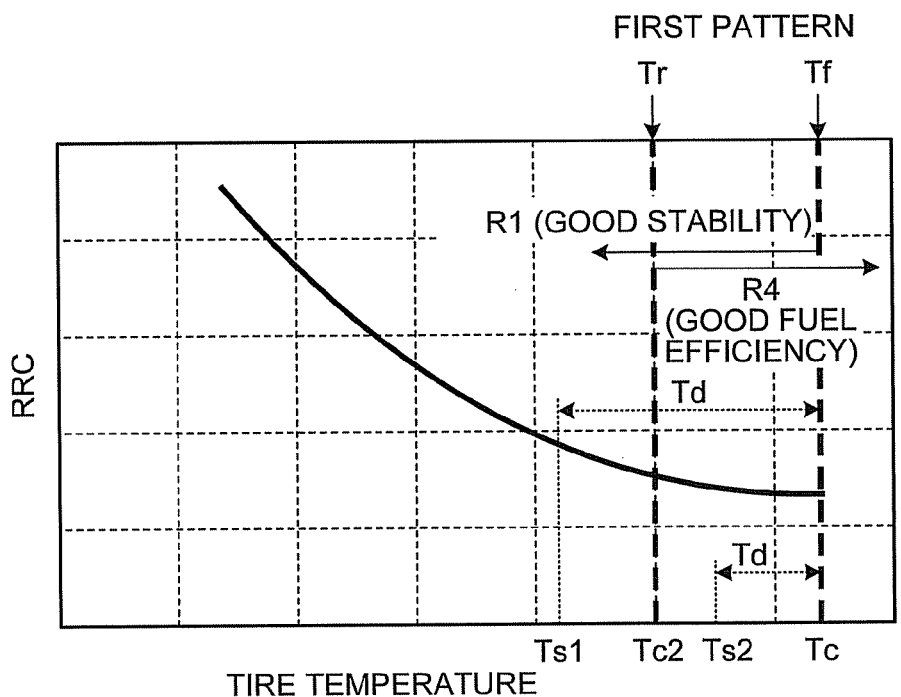
FIG. 27 is a graph illustrating respective predetermined temperatures of a first pattern according to a fifth embodiment.

FIG. 27 is a graph illustrating respective predetermined temperatures of the first pattern. FIG. 27 illustrates the first predetermined temperature Tc in the case of the first pattern plotted in FIG. 23. In the first pattern where the first predetermined temperature Tc is larger than the predetermined temperature for fuel economy Tc2, the fourth temperature region R4 where the fuel economy becomes best and the first temperature region R1 where the stability can be improved overlap each other. The ECU 8 sets the target value of the front tire temperature Tf to the first predetermined temperature Tc, and sets the target value of the rear tire temperature Tr to the predetermined temperature for fuel economy Tc2 or a temperature lower than the first predetermined temperature Tc by the predetermined temperature difference Td.

The target value of the rear tire temperature Tr may be set to any of the temperatures, for example, depending on which performances of fuel economy and stability has higher priority. Here, the temperature lower than the first predetermined temperature Tc by the predetermined temperature difference Td is described as a rear tire temporary target temperature Ts. The rear tire temporary target temperature Ts is expressed by the following expression (1).

$$Ts = Tc - Td \quad (1)$$

For example, in the case where stability has high priority, if the rear tire temporary target temperature Ts is the temperature Ts1 (see FIG. 27) lower than the predetermined temperature for fuel economy Tc2, this temperature Ts1 is set to be the target temperature of the rear tires 4R. On the other hand, if the rear tire temporary target temperature Ts is the temperature Ts2 (see FIG. 27) equal to or more than the predetermined temperature for fuel economy Tc2, the predetermined temperature for fuel economy Tc2 is set to the target temperature of the rear tires 4R. This makes the temperature difference between front and rear tires ΔT at least equal to or more than the predetermined temperature difference Td so as to ensure stability.

In contrast, in the case where fuel economy has high priority, if the rear tire temporary target temperature Ts is the temperature Ts1, the predetermined temperature for fuel economy Tc2 may be set to be the target temperature of the rear tires 4R. If the rear tire temporary target temperature Ts is the temperature Ts2, this rear tire temporary target temperature Ts2 may be set to the target temperature of the rear tires 4R.

(Second Pattern)

Figure 28:
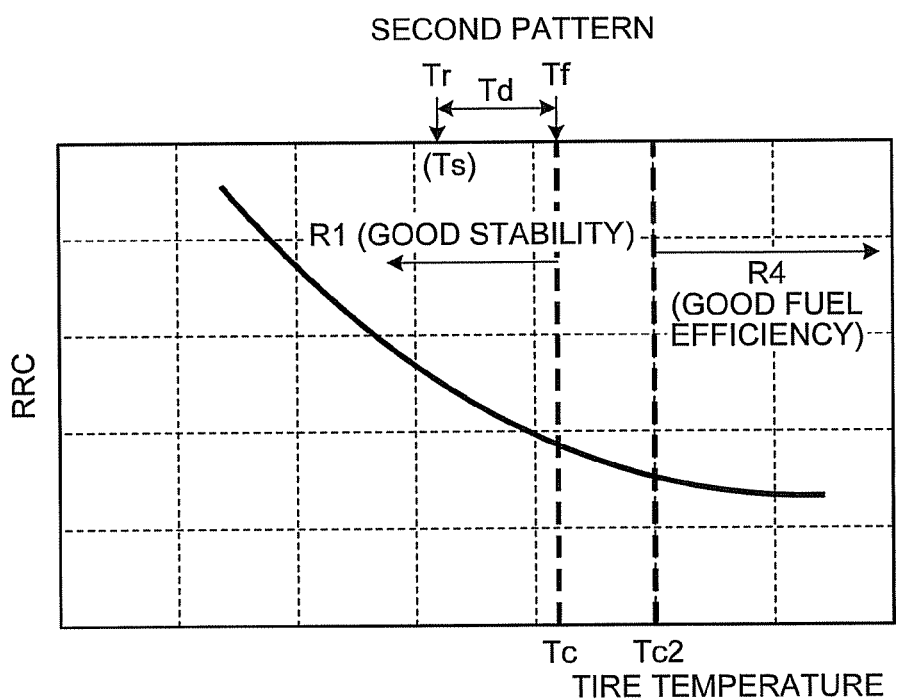
FIG. 28 is a graph illustrating respective predetermined temperatures of a second pattern according to the fifth embodiment.

FIG. 28 is a graph illustrating respective predetermined temperatures of the second pattern. FIG. 28 illustrates the first predetermined temperature Tc in the case of the second pattern plotted in FIG. 23. In the second pattern where the first predetermined temperature Tc is equal to or less than the predetermined temperature for fuel economy Tc2, the fourth temperature region R4 where the fuel economy becomes best and the first temperature region R1 where the stability can be improved do not overlap each other. The ECU 8 sets the target value of the front tire temperature Tf to the first predetermined temperature Tc, and sets the target value of the rear tire temperature Tr to the rear tire temporary target temperature Ts. This ensures stability of the vehicle 2, and can ensure better fuel economy.

Accordingly, the tire temperature control of this embodiment can ensure better fuel economy while ensuring stability by making the temperature difference between the front tires 4F and the rear tires 4R larger.

Sixth Embodiment

A sixth embodiment will be described by referring to FIG. 29 and FIG. 30. In the sixth embodiment, like reference numerals designate corresponding or identical elements to those of the above-described embodiment, and therefore such elements will not be further elaborated here. In this embodiment, the tire temperature control is performed to ensure the compatibility between two performances of a stopping distance and stability.

As described by referring to FIG. 14, from the aspect of improving stability, the stability factor is preferred to be larger. That is, decreasing the rear tire temperature Tr with respect to the front tire temperature Tf is preferred from the aspect of improving stability. It is preferred that the tire temperature not be higher than the first predetermined temperature Tc. From the aspect of shortening a stopping distance, as described by referring to FIG. 24, it is preferred that the tire temperature be controlled to be in a temperature region where the friction coefficient μ is high.

In this embodiment, the ECU 8 performs the tire temperature control in the following two patterns.
(1) a first pattern expressed by the first predetermined temperature Tc>the predetermined temperature for stopping Tc3
(2) a second pattern expressed by the first predetermined temperature Tc≤the predetermined temperature for stopping Tc3

(First Pattern)

Figure 29:
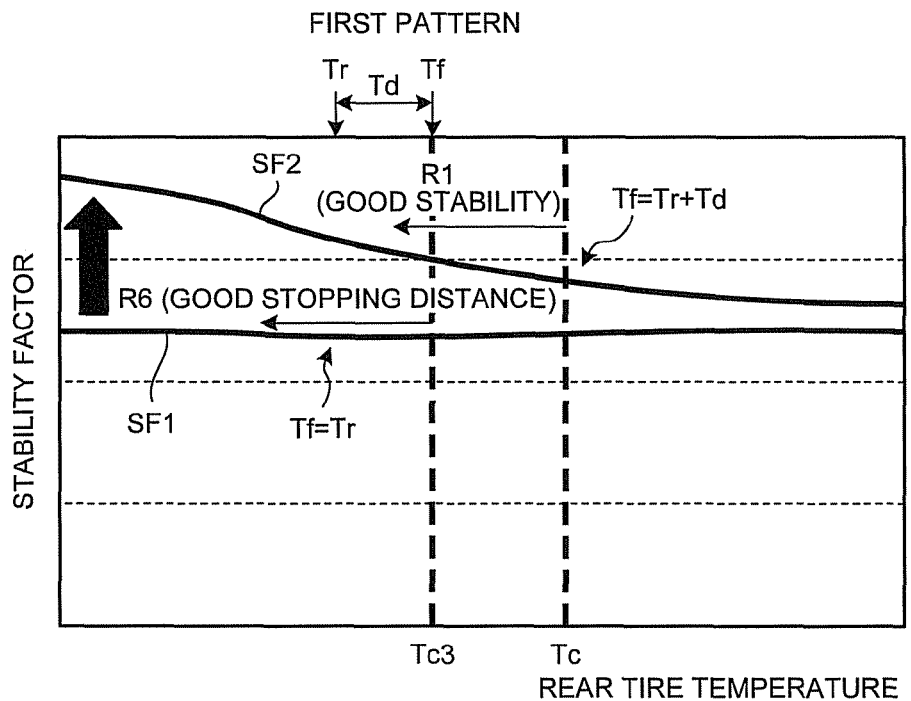
FIG. 29 is a graph illustrating respective predetermined temperatures of a first pattern according to a sixth embodiment.

FIG. 29 is a graph illustrating respective predetermined temperatures of the first pattern. FIG. 29 illustrates the predetermined temperature for stopping Tc3 in the case of the first pattern plotted in FIG. 14. In the first pattern where the first predetermined temperature Tc is larger than the predetermined temperature for stopping Tc3, the first temperature region R1 where the stability can be improved and the sixth temperature region R6 where the stopping distance can be short overlap each other. The first temperature region R1 extends to a high temperature side compared with the sixth temperature region R6. The ECU 8 sets the target value of the front tire temperature Tf to the predetermined temperature for stopping Tc3, and sets the target value of the rear tire temperature Tr to a temperature lower than the predetermined temperature for stopping Tc3 by the predetermined temperature difference Td. This ensures maximum compatibility between stopping distance performance and stability of the vehicle 2.

(Second Pattern)

Figure 30:
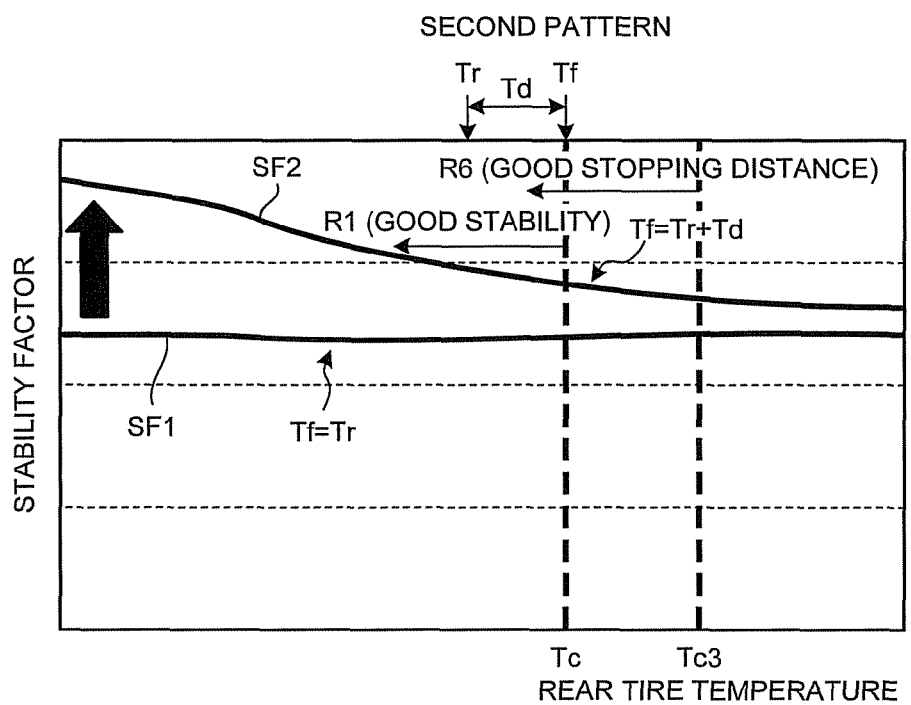
FIG. 30 is a graph illustrating respective predetermined temperatures of a second pattern according to the sixth embodiment.

FIG. 30 is a graph illustrating respective predetermined temperatures of the second pattern. FIG. 30 illustrates the predetermined temperature for stopping Tc3 in the case of the second pattern plotted in FIG. 14. In the second pattern where the first predetermined temperature Tc is equal to or less than the predetermined temperature for stopping Tc3, the first temperature region R1 where the stability can be improved and the sixth temperature region R6 where the stopping distance can be short overlap each other. The sixth temperature region R6 extends to a high temperature side compared with the first temperature region R1. The ECU 8 sets the target value of the front tire temperature Tf to the first predetermined temperature Tc, and sets the target value of the rear tire temperature Tr to the rear tire temporary target temperature Ts. This ensures maximum compatibility between stopping distance performance and stability of the vehicle 2.

Seventh Embodiment

A seventh embodiment will be described by referring to FIG. 31 and FIG. 32. In the seventh embodiment, like reference numerals designate corresponding or identical elements to those of the above-described embodiment, and therefore such elements will not be further elaborated here. In this embodiment, the tire temperature control is performed to ensure the compatibility between two performances of a stopping distance and maneuverability.

As described by referring to FIG. 3, from the aspect of improving maneuverability, the normalized CP of the front tires 4F is preferred to be higher. From the aspect of shortening a stopping distance, as described by referring to FIG. 24, it is preferred that the tire temperature be controlled to be in a temperature region where the friction coefficient μ is high.

In this embodiment, the ECU 8 performs the tire temperature control in the following two patterns.
(1) a first pattern expressed by the first predetermined temperature Tc>the predetermined temperature for stopping Tc3
(2) a second pattern expressed by the first predetermined temperature Tc≤the predetermined temperature for stopping Tc3

(First Pattern)

Figure 31:
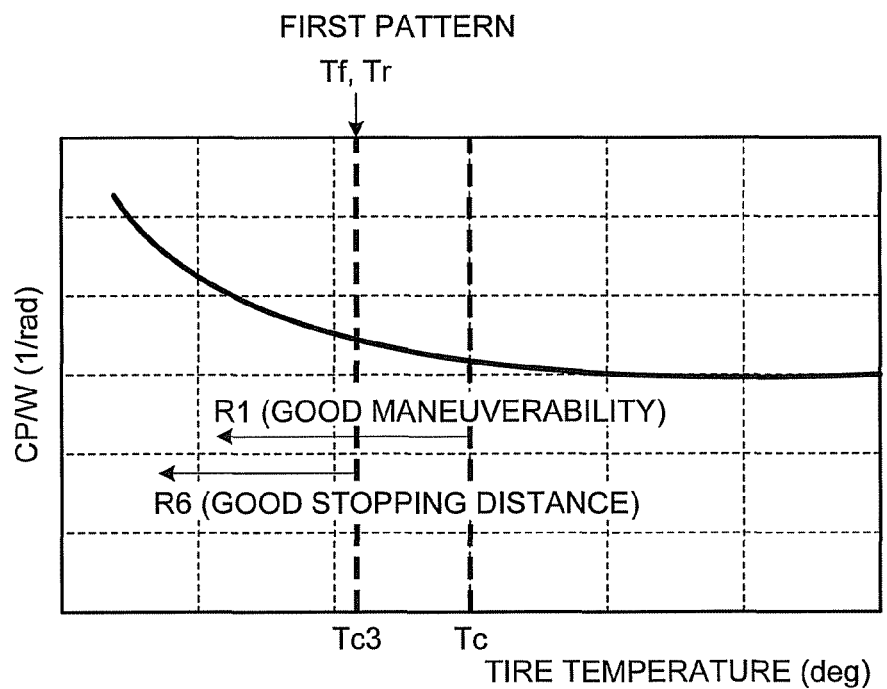
FIG. 31 is a graph illustrating respective predetermined temperatures of a first pattern according to a seventh embodiment.

FIG. 31 is a graph illustrating respective predetermined temperatures of the first pattern. FIG. 31 illustrates the predetermined temperature for stopping Tc3 in the case of the first pattern plotted in FIG. 3. Here, the characteristics of the tire B are omitted. In the first pattern where the first predetermined temperature Tc is larger than the predetermined temperature for stopping Tc3, the first temperature region R1 where the maneuverability can be improved and the sixth temperature region R6 where the stopping distance can be short overlap each other. The first temperature region R1 extends to a high temperature side compared with the sixth temperature region R6. The ECU 8 sets both the target values of the front tire temperature Tf and the rear tire temperature Tr to the predetermined temperature for stopping Tc3. This ensures maximum compatibility between improved maneuverability and shortened stopping distance.

(Second Pattern)

Figure 32:
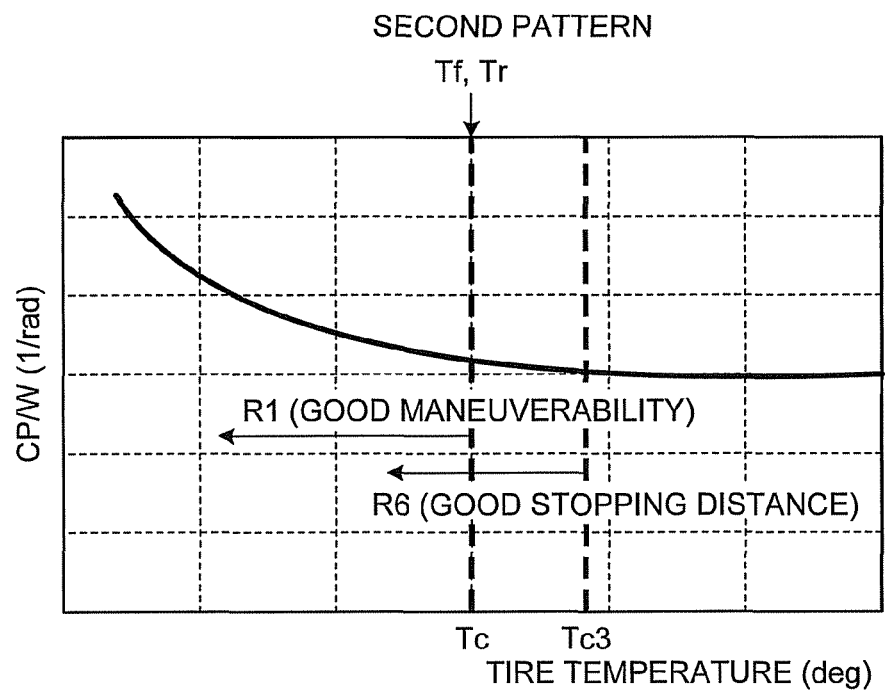
FIG. 32 is a graph illustrating respective predetermined temperatures of a second pattern according to the seventh embodiment.

FIG. 32 is a graph illustrating respective predetermined temperatures of the second pattern. FIG. 32 illustrates the predetermined temperature for stopping Tc3 in the case of the second pattern plotted in FIG. 3. In the second pattern where the first predetermined temperature Tc is equal to or less than the predetermined temperature for stopping Tc3, the first temperature region R1 where the maneuverability can be improved and the sixth temperature region R6 where the stopping distance can be short overlap each other. The sixth temperature region R6 extends to a high temperature side compared with the first temperature region R1. The ECU 8 sets both the target values of the front tire temperature Tf and the rear tire temperature Tr to the first predetermined temperature Tc. This ensures maximum compatibility between improved maneuverability and shortened stopping distance.

Eighth Embodiment

An eighth embodiment will be described by referring to FIG. 33 and FIG. 34. In the eighth embodiment, like reference numerals designate corresponding or identical elements to those of the above-described embodiment, and therefore such elements will not be further elaborated here. In this embodiment, the tire temperature control is performed to ensure the compatibility between two performances of fuel economy and maneuverability of the vehicle 2.

As described by referring to FIG. 3, from the aspect of improving maneuverability, the normalized CP of the front tires 4F is preferred to be higher. From the aspect of improving fuel economy, as described by referring to FIG. 23, the temperature of the tires 4 is preferred to be higher.

In this embodiment, the ECU 8 performs the tire temperature control in the following two patterns.

(1) a first pattern expressed by the first predetermined temperature Tc>the predetermined temperature for fuel economy Tc2

(2) a second pattern expressed by the first predetermined temperature Tc≤the predetermined temperature for fuel economy Tc2

(First Pattern)

Figure 33:
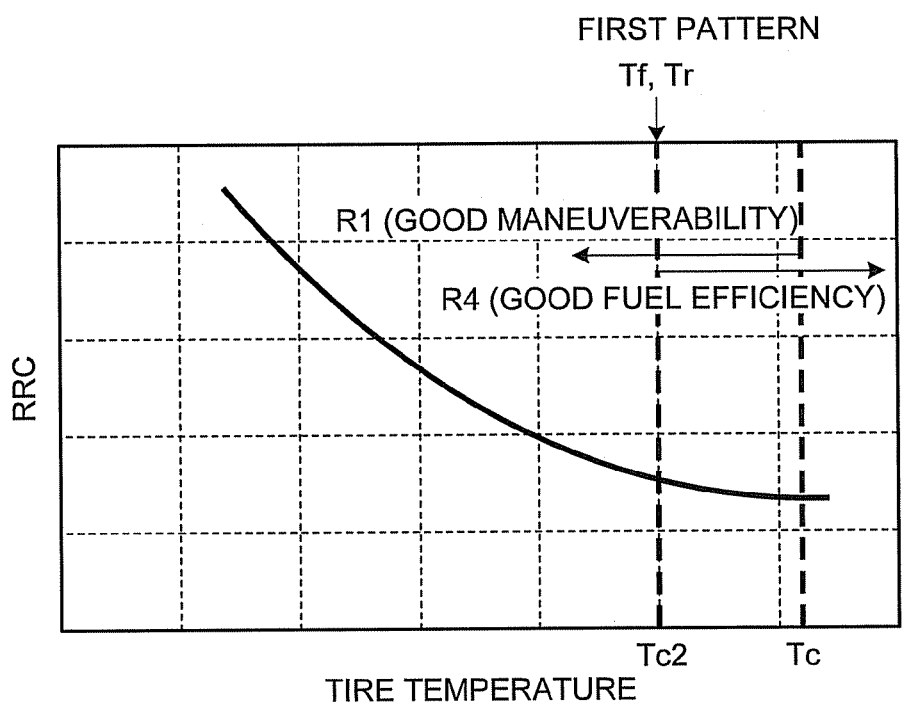
FIG. 33 is a graph illustrating respective predetermined temperatures of a first pattern according to an eighth embodiment.

FIG. 33 is a graph illustrating respective predetermined temperatures of the first pattern. FIG. 33 illustrates the first predetermined temperature Tc in the case of the first pattern plotted in FIG. 23. In the first pattern where the first predetermined temperature Tc is larger than the predetermined temperature for fuel economy Tc2, the fourth temperature region R4 where the fuel economy becomes best and the first temperature region R1 where the maneuverability can be improved by the tire temperature control overlap each other.

The ECU 8 sets both the target values of the front tire temperature Tf and the rear tire temperature Tr to the predetermined temperature for fuel economy Tc2. This ensures maximum compatibility between improved maneuverability and improved fuel economy. The target value of the rear tire temperature Tr may be set to the first predetermined temperature Tc.

(Second Pattern)

Figure 34:
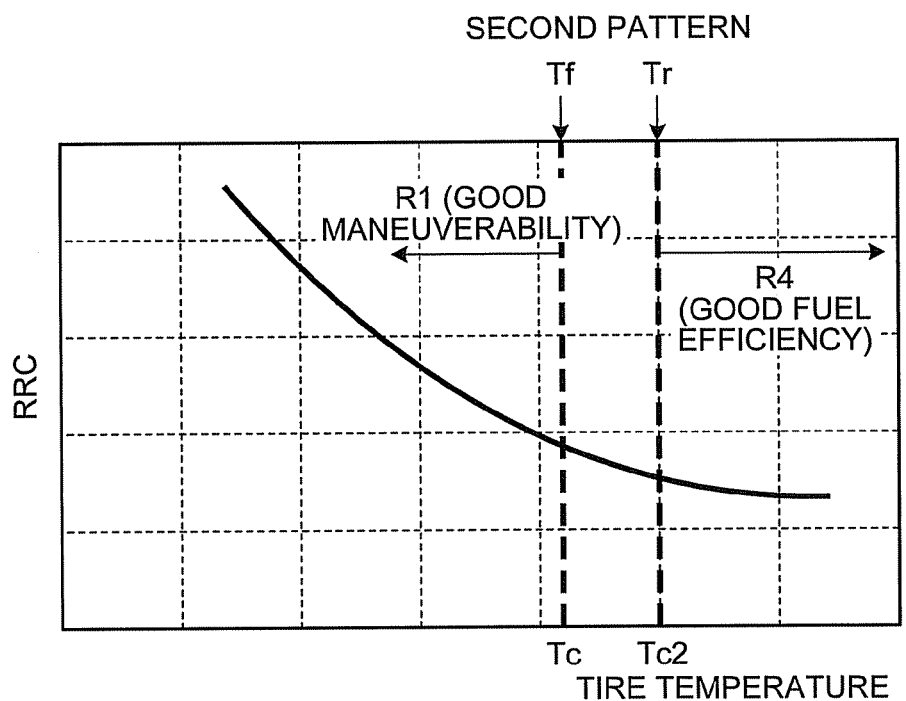
FIG. 34 is a graph illustrating respective predetermined temperatures of a second pattern according to the eighth embodiment.

FIG. 34 is a graph illustrating respective predetermined temperatures of the second pattern. FIG. 34 illustrates the first predetermined temperature Tc in the case of the second pattern plotted in FIG. 23. In the second pattern where the first predetermined temperature Tc is equal to or less than the predetermined temperature for fuel economy Tc2, the fourth temperature region R4 where the fuel economy becomes best and the first temperature region R1 where the stability can be improved by the tire temperature control do not overlap each other. The ECU 8 sets the target value of the front tire temperature Tf to the first predetermined temperature Tc, and sets the target value of the rear tire temperature Tr to the predetermined temperature for fuel economy Tc2. This increases the normalized CP of the front tires 4F to improve maneuverability, and also decreases the rolling resistance coefficient of the rear tires 4R to improve fuel economy.

The matters that are disclosed in the respective embodiments described above may be combined as necessary.

INDUSTRIAL APPLICABILITY

As described above, the tire temperature control device according to the present invention is appropriate for improving running performance of the vehicle.

REFERENCE SIGNS LIST 1-1 tire temperature control device
2 vehicle
3 wheel
4 tire
6 temperature control means
7 temperature sensor
8 ECU
Tf front tire temperature
Tr rear tire temperature
Tc first predetermined temperature
Tc2 second predetermined temperature
Tc3 third predetermined temperature
Td predetermined temperature difference
ΔT temperature difference between front and rear tires

The invention claimed is:

1. A tire temperature control device comprising:

A temperature control unit configured to control at least one of a tire temperature of a front wheel and a tire temperature of a rear wheel based on a temperature difference between the tire temperature of the front wheel and the tire temperature of the rear wheel of a vehicle, wherein the temperature control unit is configured to make the tire temperature of the rear wheel less than the tire temperature of the front wheel, in a case where a first predetermined temperature that is based on a temperature characteristic of the tire related to maneuverability of the vehicle is higher than a second predetermined temperature that is based on a temperature characteristic of the tire related to a fuel economy of the vehicle, the temperature control unit makes the tire temperature of the front wheel to be the first predetermined temperature and also makes the tire temperature of the rear wheel to be the second predetermined temperature or a temperature lower than the first predetermined temperature by a predetermined temperature difference, and in a case where the first predetermined temperature is equal to or less than the second predetermined temperature, the temperature control unit makes the tire temperature of the front wheel to be the first predetermined temperature, and also makes the tire temperature of the rear wheel to be the temperature lower than the first predetermined temperature by the predetermined temperature difference.

2. A tire temperature control device comprising:

a temperature control unit configured to control at least one of a tire temperature of a front wheel and a tire temperature of a rear wheel based on a temperature difference between the tire temperature of the front wheel and the tire temperature of the rear wheel of a vehicle, wherein the temperature control unit is configured to make the tire temperature of the rear wheel less than the tire temperature of the front wheel, in a case where a first predetermined temperature that is based on a temperature characteristic of the tire related to maneuverability of the vehicle is higher than a third predetermined temperature that is based on a temperature characteristic of the tire related to a friction coefficient, the temperature control unit makes the tire temperature of the front wheel to be the third predetermined temperature and also makes the tire temperature of the rear wheel to be a temperature lower than the third predetermined temperature by a predetermined temperature difference, and in a case where the first predetermined temperature is equal to or less than the third predetermined temperature, the temperature control unit makes the tire temperature of the front wheel to be the first predetermined temperature and also makes the tire temperature of the rear wheel to be the temperature lower than the first predetermined temperature by the predetermined temperature difference.

3. A tire temperature control device comprising:

a temperature control unit configured to control at least one of a tire temperature of a front wheel and a tire temperature of a rear wheel based on a temperature difference between the tire temperature of the front wheel and the tire temperature of the rear wheel of a vehicle, wherein in a case where a first predetermined temperature that is based on a temperature characteristic of the tire related to maneuverability of the vehicle is higher than a third predetermined temperature that is based on a temperature characteristic of the tire related to a friction coefficient, the temperature control unit makes the tire temperatures of the front wheel and the rear wheel to be the third predetermined temperature, and in a case where the first predetermined temperature is equal to or less than the third predetermined temperature, the temperature control unit makes the tire temperatures of the front wheel and the rear wheel to be the first predetermined temperature.

4. A tire temperature control device comprising:

a temperature control unit configured to control at least one of a tire temperature of a front wheel and a tire temperature of a rear wheel based on a temperature difference between the tire temperature of the front wheel and the tire temperature of the rear wheel of a vehicle, wherein in a case where a first predetermined temperature that is based on a temperature characteristic of the tire related to maneuverability of the vehicle is higher than a second predetermined temperature that is based on a temperature characteristic of the tire related to a fuel economy of the vehicle, the temperature control unit makes the tire temperatures of the front wheel and the rear wheel to be the second predetermined temperature, and in a case where the first predetermined temperature is equal to or less than the second predetermined temperature, the temperature control unit makes the tire temperature of the front wheel to be the first predetermined temperature and also makes the tire temperature of the rear wheel to be the second predetermined temperature.

5. A tire temperature control device comprising:

a temperature control unit configured to control at least one of a tire temperature of a front wheel and a tire temperature of a rear wheel based on a temperature difference between the tire temperature of the front wheel and the tire temperature of the rear wheel of a vehicle, wherein in a case where a second predetermined temperature that is based on a temperature characteristic of the tire related to a fuel economy of the vehicle is higher than a third predetermined temperature that is based on a temperature characteristic of the tire related to a friction coefficient, the temperature control unit makes the tire temperature of the front wheel to be the second predetermined temperature or the third predetermined temperature, and also makes the tire temperature of the rear wheel to be the second predetermined temperature, in a case where the second predetermined temperature approximates the third predetermined temperature, the temperature control unit makes the tire temperatures of the front wheel and the rear wheel to be the second predetermined temperature, and in a case where the second predetermined temperature is lower than the third predetermined temperature, the temperature control unit makes the tire temperatures of the front wheel and the rear wheel to be the third predetermined temperature.

* * * * *